US007282682B2

(12) United States Patent
Suenaga et al.

(10) Patent No.: US 7,282,682 B2
(45) Date of Patent: Oct. 16, 2007

(54) HIGH-FREQUENCY HEATING APPARATUS

(75) Inventors: Haruo Suenaga, Osaka (JP); Hideaki Moriya, Nara (JP); Shinichi Sakai, Nara (JP); Hisashi Morikawa, Nara (JP); Nobuo Shirokawa, Nara (JP); Manabu Kinoshita, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/599,670

(22) PCT Filed: Apr. 26, 2005

(86) PCT No.: PCT/JP2005/007888

§ 371 (c)(1),
(2), (4) Date: Oct. 5, 2006

(87) PCT Pub. No.: WO2005/109957

PCT Pub. Date: Nov. 17, 2005

(65) Prior Publication Data

US 2007/0175890 A1 Aug. 2, 2007

(30) Foreign Application Priority Data

May 10, 2004 (JP) ............................ 2004-139994

(51) Int. Cl.
*H05B 6/68* (2006.01)
*H02M 3/337* (2006.01)

(52) U.S. Cl. ...................... 219/715; 219/716; 219/718; 363/17; 363/98

(58) Field of Classification Search ................ 219/702, 219/761, 715–718; 363/17, 98, 97; 315/39.51
See application file for complete search history.

(56) References Cited

U.S. PATENT DOCUMENTS 5,181,160 A * 1/1993 Okamoto et al. ............. 363/97
6,362,463 B1 * 3/2002 Bessyo et al. .............. 219/715
6,624,579 B2 * 9/2003 Yasui et al. .............. 315/39.51

FOREIGN PATENT DOCUMENTS

| | | |
|---|---|---|
| JP | 7-161464 | 6/1995 |
| JP | 11-26153 | 1/1999 |
| JP | 2000-58252 | 2/2000 |
| JP | 2003-259643 | 9/2003 |

* cited by examiner

*Primary Examiner*—Philip H. Leung
(74) *Attorney, Agent, or Firm*—Pearne & Gordon LLP

(57) ABSTRACT

A purpose of the present invention is to provide an inverter circuit capable of firmly turning ON IGBTs under limited condition, while a heat loss and noise can be hardly produced in semiconductor switching elements.

In a resonant type high frequency heating apparatus which is arranged by employing a DC power supply; a series connection circuit constructed of two semiconductor switching elements which are connected to the DC power supply; another series connection circuit constituted by a capacitor and a primary winding of a leakage transformer connected to both the terminals of one of the two semiconductor switching elements; and a driving means for driving the respective semiconductor switching elements respectively, a variable dead time forming circuit is provided in the driving means, while the variable dead time forming circuit makes a dead time constant at a switching frequency lower than, or equal to a predetermined switching frequency, and also, rapidly increases a dead time at a switching frequency higher than, or equal to the predetermined switching frequency. Furthermore, when the switching frequency becomes high, a limitation is provided by which the dead time is not further widened.

14 Claims, 14 Drawing Sheets

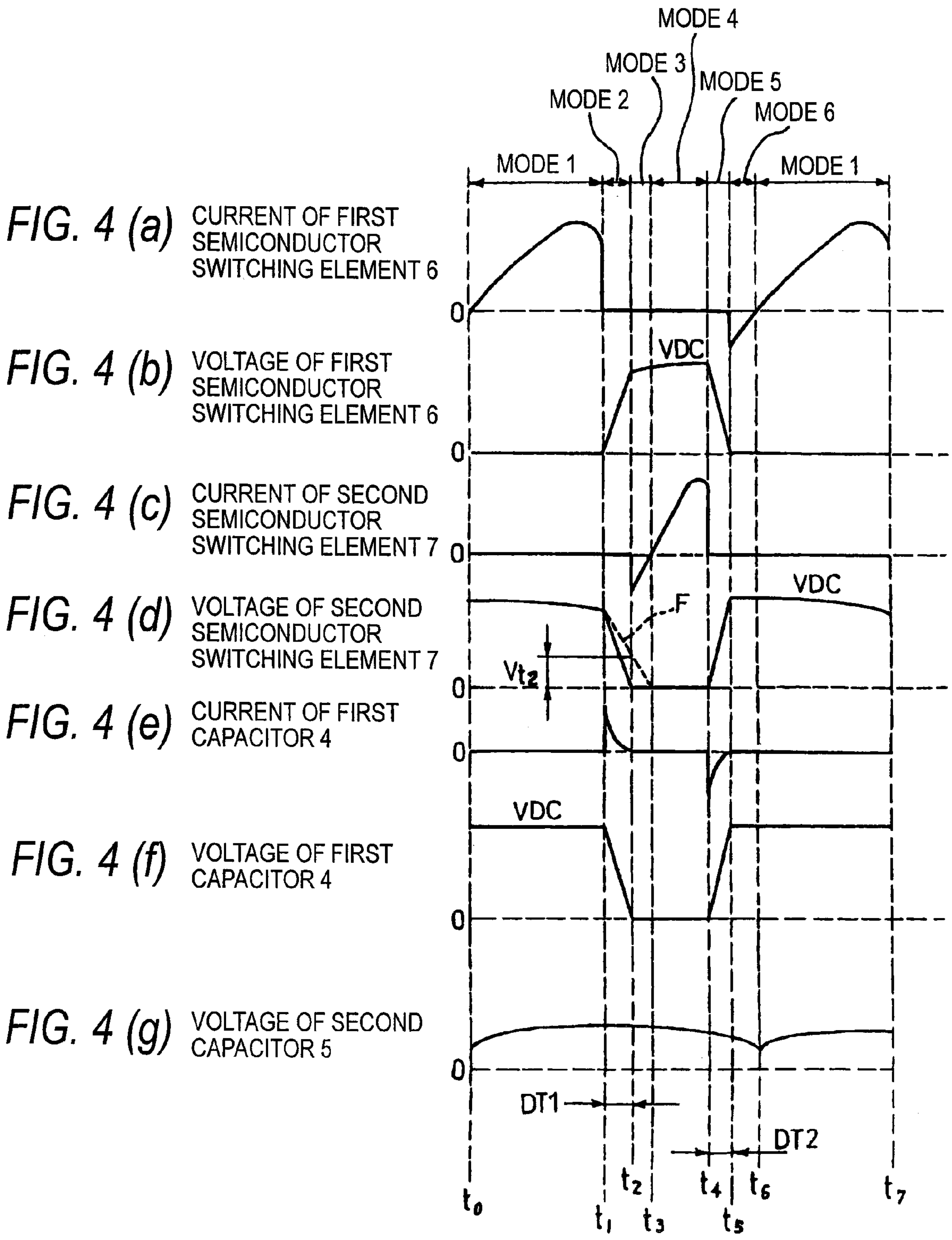
MODE 4
MODE 3
MODE 2
MODE 5
MODE 6
MODE 1
MODE 1
FIG. 4 (a) CURRENT OF FIRST SEMICONDUCTOR SWITCHING ELEMENT 6
0
FIG. 4 (b) VOLTAGE OF FIRST SEMICONDUCTOR SWITCHING ELEMENT 6
VDC
0
FIG. 4 (c) CURRENT OF SECOND SEMICONDUCTOR SWITCHING ELEMENT 7
0
FIG. 4 (d) VOLTAGE OF SECOND SEMICONDUCTOR SWITCHING ELEMENT 7
VDC
F
Vt2
0
FIG. 4 (e) CURRENT OF FIRST CAPACITOR 4
0
FIG. 4 (f) VOLTAGE OF FIRST CAPACITOR 4
VDC
0
FIG. 4 (g) VOLTAGE OF SECOND CAPACITOR 5
0
DT1
DT2
t0
t1
t2
t3
t4
t5
t6
t7

(1) V100≠V101

(2) V100<12V

FIG. 10 (a)
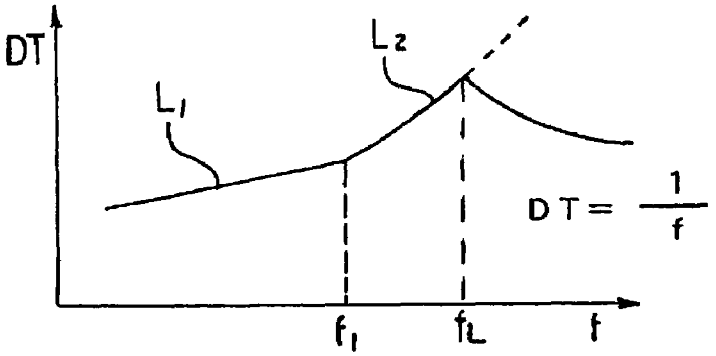
FIG. 10 (b1)
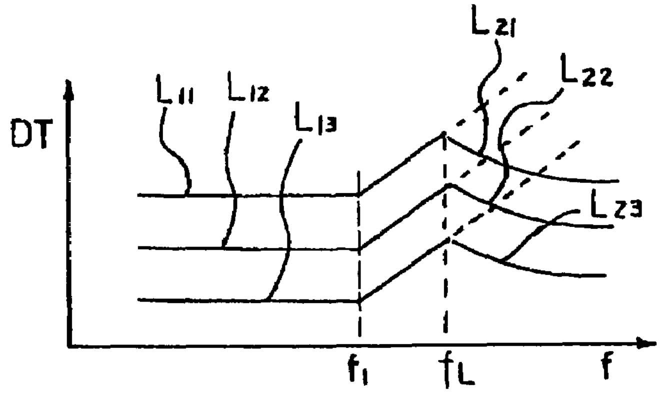
FIG. 10 (b2)
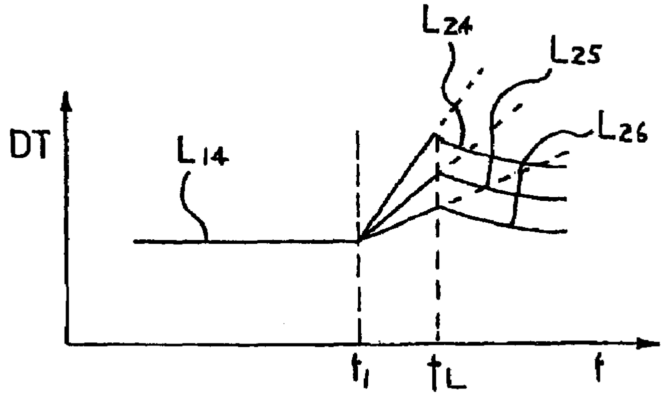
FIG. 10 (b3)
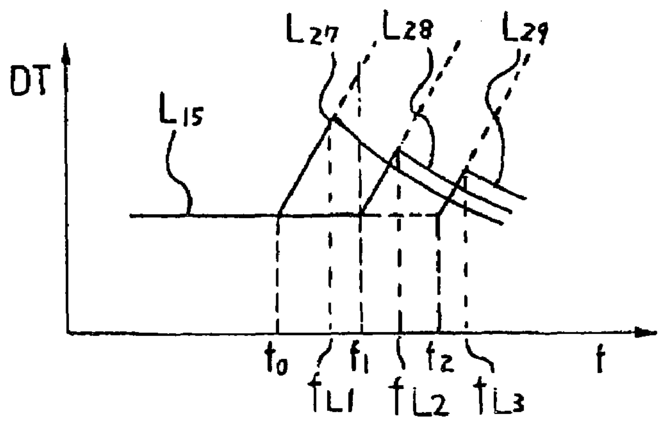

HIGH-FREQUENCY HEATING APPARATUS

TECHNICAL FIELD

The present invention relates to a high frequency heating apparatus using a magnetron such as a microwave oven. More specifically, the present invention is directed to an inverter circuit of such a high frequency heating apparatus.

BACKGROUND ART

Since conventional power supplies mounted on high frequency heating apparatus have been made heavy and bulky, these conventional power supplies are desired to be made compact and light weight. As a result, various technical ideas capable of manufacturing these power supplies in compact, light weight and low cost have be actively progressed in such a way that these power supplies are constructed in switching modes. In high frequency heating apparatus which cook food products by using microwaves generated by magnetrons, various needs capable of making power supplies compact and in light weight have been requested, which are employed so as to drive magnetrons. These needs could be realized by switching-type inverter circuits.

Among these switching type inverter circuits, more specifically, a high frequency inverter circuit which is directed by the present invention corresponds to a resonant type circuit system with employment of two switching elements which construct bridge circuits (refer to, for example, JP-A-2000-58252.

When a 1-transistor type inverter (width ON/OFF-control type inverter) is arranged, a withstanding voltage between a collector and an emitter of this transistor requires approximately 1000V. However, when a 2-transistor type inverter having a bridge circuit is arranged, withstanding voltages between collectors and emitters of these transistors are not required to be so high withstanding voltages. As a result, if the inverter circuit is constructed of the bridge circuit arrangement, then the withstanding voltages between the collectors and the emitters of these transistors may be lowered to approximately 600 V. Accordingly, there is such a merit that low-cost transistors may be used in these transistor inverters. In this sort of inverter, while a resonant circuit is constituted by an inductance "L" and a capacitance "C", this inverter owns such a resonance characteristic as represented in FIG. 1, in which a resonant frequency "f0" is defined as a peak.

FIG. 1 is a graphic diagram for representing a current-to-used frequency characteristic in the case that a constant voltage is applied to an inverter resonant circuit according to the present invention.

A frequency "f0" corresponds to a resonant frequency of an LC resonant circuit of the inverter circuit, and a current-to-frequency characteristic curve "I1" of a frequency range defined from "f1" to "f3", which is higher than this resonant frequency "f0" is utilized.

At the resonant frequency "f0", a current I1 becomes maximum, and in connection with an increase of the frequency range from f1 to f3, this current I1 is decreased. Within the frequency range defined from f1 to f3, the lower the frequency is decreased, the closer the frequency is approached to the resonant frequency f0, so that the current I1 is increased. As a result, a current flowing through a secondary winding of a leakage transformer is increased. Conversely, the higher the frequency is increased, the further the frequency is separated apart from the resonant frequency f0, so that the current I1 is decreased. As a result, the current flowing through the secondary winding of the leakage transformer is decreased. In the inverter circuit for driving a microwave oven which functions as a non-linear load, since this frequency is varied, power of the microwave oven is changed.

As will be explained later, in the case that an input power supply for a microwave oven using a non-linear load of a magnetron corresponds to an AC source such as a commercial power supply, the microwave oven causes a switching frequency to be changed.

As to respective high frequency power of a microwave oven, the highest frequency appears at temperatures of approximately 90 degrees and about 270 degrees. For instance, when the microwave oven is operated at 200 W, the operating frequency is approached to f3; when the microwave oven is operated at 500 W, the operating frequency is lower than f3; and when the microwave oven is operated at 1000 W, the operating frequency is further lower than f3. Apparently, since either an input power control or an input current control is carried out, this frequency may be changed in accordance with changes as to voltages of a commercial power supply, temperatures of the microwave oven, and the like.

Also, in the vicinity of 0 degree and 180 degrees of phases of the above-described power supply voltage, since the operating frequency of the magnetron is set near the frequency "f1" which is close to the resonant frequency "f0" where the resonant current is increased in correspondence with such a characteristic of a magnetron that if a high voltage is not applied thereto, then this magnetron is not resonated in a high frequency, a boosting ratio of the voltage applied to the magnetron to the voltage of the commercial power supply is increased, and also, the phase width of the commercial power supply is set to be widened, by which electromagnetic waves are produced from the magnetron.

FIG. 2 shows an example of a resonant type high frequency heating apparatus operated by switching elements of a two-element bridge circuit, which is described in JP-A-2000-58252. In FIG. 2, the high frequency heating apparatus has been arranged by a DC power supply 1, a leakage transformer 2, a first semiconductor switching element 6, a first capacitor 4, a second capacitor 5, a third capacitor (smoothing capacitor) 13, a second semiconductor switching element 7, a driving unit 8, a full-wave doubler rectifying circuit 10, and a magnetron 11.

The DC power supply 1 rectifies an AC voltage of a commercial power supply in a full-wave rectification mode to produce a DC voltage VDC, and then, applies the DC voltage VDC to a series circuit constituted by the second capacitor 5 and a primary winding 3 of the leakage transformer 2. While the first semiconductor switching element 6 has been series-connected to the second semiconductor switching element 7, the series circuit constituted by the primary winding 3 of the leakage transformer 2 and the second capacitor 5 has been connected parallel to the second semiconductor switching element 7.

The first capacitor 4 has been connected parallel to the second semiconductor switching element 7. An AC high voltage output generated from a secondary winding 9 of the leakage transformer 2 has been converted into a DC high voltage by the full-wave doubler rectifying circuit 10, and then, this DC high voltage has been applied between an anode and a cathode of the magnetron 11. A thirdly winding 12 of the leakage transformer 2 supplies a current to the cathode of the magnetron 11.

The first semiconductor switching element 6 has been constituted by an IGBT (Insulated Gate Bipolar Transistor) and a flywheel diode connected parallel to the IGBT. Similarly, the second semiconductor switching element 7 has been constituted by an IGBT and a flywheel diode connected parallel to the IGBT.

As apparent from the foregoing description, both the first and second semiconductor switching elements 6 and 7 are not limited only to the above-explained sort of semiconductor switching element, but a thyristor, a GTO (Gate Turn Off) switching element, and the like may be alternatively employed.

The driving unit 8 contains an oscillating unit which is used so as to produce drive signals for driving the first semiconductor switching element 6 and the second semiconductor switching element 7. While this oscillating unit oscillates the drive signals having predetermined frequencies and duty ratios, the driving unit 8 has applied these drive signals to the first semiconductor switching element 6 and the second semiconductor switching element 7.

The first semiconductor switching element 6 and the second semiconductor switching element 7 are alternately driven, or are driven by providing such a time period during which both the first and second semiconductor switching elements 6 and 7 are commonly turned OFF, namely by providing a dead time by employing a dead time forming means (will be explained later).

Although this dead time will be described in detail, just after any one of the first and second semiconductor switching elements 6 and 7 has been turned OFF, a voltage across the terminals of the other semiconductor switching element is high. As a result, if the other semiconductor switching element is turned ON at this time, then an excessively large current having a spike shape may flow through this turned-ON switching element, so that unwanted loss and undesirable noise may be produced. However, since this turn-ON operation may be delayed until the high voltage across the switching element is decreased to approximately 0 V, the above-described loss and noise may be prevented. Apparently, a similar operation may be carried out when the switching element opposite to the above-described switching element is turned OFF.

FIG. 3 indicates respective modes in which the circuit of FIG. 2 is operated.

Also, FIG. 4 shows a voltage and current waveform diagram as to components such as semiconductor switching elements employed in the circuit.

In the drawing, in a mode 1 of FIG. 3(*a*), a drive signal is supplied to the first semiconductor switching element 6. At this time, a current flows from the DC power supply 1 through both the primary winding 3 of the leakage transformer 2 and the second capacitor 5.

In a mode 2 of FIG. 3(*b*), the first semiconductor switching element 6 is turned OFF, and the current which has flown through the primary winding 3 and the second capacitor 5 starts to flow along a direction to the first capacitor 4, and at the same time, the voltage of the first semiconductor switching element 6 is increased.

In a mode 3 of FIG. 3(*c*), the voltage of the first capacitor 4 is directed from VDC to zero V. In the mode 3, the voltage across both the terminals of the first capacitor 4 is reached to zero V, so that the diode which constitutes the second switching element 7 is turned ON.

In a mode 4 of FIG. 3(*d*), since the direction of the current is inverted which has flown through the primary winding 3 and the second capacitor 5 due to the resonant phenomenon, at this time, the second semiconductor switching element 7 must be turned OFF. In the time periods of the modes 2, 3, and 4, the voltage of the first semiconductor switching element 6 becomes equivalent to the DC power supply voltage VDC. In such a region as Europe where an effective value as to a commercial power supply voltage is 230 V, since a voltage peak becomes root 2 times higher than the effective voltage, a DC power supply voltage VDC becomes near equal to 325 V.

In a mode 5 of FIG. 3(*e*), the second semiconductor switching element 7 is turned OFF, and the current which has flown through the second capacitor 5 and the primary winding 3 starts to flow along a direction to the first capacitor 4, so that the voltage of the first capacitor 4 is increased up to the VDC.

In a mode 6 of FIG. 3(*f*), the voltage of the first capacitor 4 is reached to the voltage VDC, and thus, the diode which constitutes the first semiconductor switching element 6. Since the direction of the current is inverted which has flown through the primary winding 3 and the second capacitor 5 due to the resonant phenomenon, at this time, the first semiconductor switching element 6 must be turned ON, which constitutes the mode 1. In the time periods of the modes 1 and 6, the voltage of the second semiconductor switching element 7 becomes equivalent to the DC power supply voltage VDC.

In accordance with this circuit arrangement, a maximum value as to the voltages applied to both the first semiconductor switching element 6 and the second semiconductor switching element 7 can be set to the DC power supply voltage VDC.

Both the mode 2 and the mode 5 correspond to such a resonant period during which the current flown from the primary winding 3 may flow through the first capacitor 4 and the second capacitor 5. Since a capacitance value of the first capacitor 4 has been set lower than, or equal to 1/10 of a capacitance value of the second capacitor 5, a combined capacitance value becomes nearly equal to the capacitance value of the first capacitor 4. The voltages applied to the first semiconductor switching element 6 and the second semiconductor switching element 7 in the modes 3 and 5 are changed based upon a time constant which is determined by this combined capacitance value and an impedance of the leakage transformer 3. Since this voltage change owns such an inclination which is determined based upon the above-explained time constant, the switching loss occurred when the first semiconductor switching element 6 is turned OFF in the mode 3 may be reduced.

Moreover, in the mode 5, since the voltage becomes zero, when the first semiconductor switching element 6 is turned ON in the mode 1, the voltage applied to the first semiconductor switching element 6 becomes zero, so that the switching loss of the first semiconductor switching element 6 can be reduced when this switching element 6 is turned ON. This is referred to as a "zero voltage switching" operation, and these items are features of the resonant circuit system. The present system utilizes these features, and owns such a merit that a voltage of a semiconductor switching element does not become higher than, or equal to the DC power supply voltage VDC. As shown in FIG. 4, the capacitance value of the second capacitor 5 has been set to a sufficiently large capacitance value in such a manner that the voltage of this second capacitor 5 contains a small ripple component.

On the other hand, as shown in FIG. 2, in such an inverter circuit that the series connection circuit constructed of the first and second switching elements 6 and 7 has been connected parallel to the DC power supply 1 and the arm has been constituted by two switching elements, since the ON/OFF operations of the first and second semiconductor switching elements 6 and 7 are alternately repeated, the high frequency AC voltage is generated in the primary winding 3 of the leakage transformer 2, and then, the high frequency high-voltage is induced in the secondary winding 9. Such an instantaneous time period during which both the first and second semiconductor switching elements 6 and 7 are turned ON at the same time is not completely provided. This is because the short circuit of the DC power supply 1 may occur.

Under such a circumstance, conventionally, a time period (will be referred to as "dead time" and will be abbreviated as "DT") has been necessarily provided, during which both the first and second switching elements 6 and 7 are not turned ON after any one of the first and second semiconductor switching elements 6 and 7 has been turned OFF until the remaining semiconductor switching element is turned ON.

Now, the dead time (DT) will be explained with reference to FIG. 4. FIG. 4 indicates voltage waveforms and current waveforms as to the first and second semiconductor switching elements 6 and 7 (FIG. 2), and the first and second capacitors 4 and 5 (FIG. 2) in the above-explained respective modes 1 to 6.

In FIG. 4, (a) shows a current waveform of the first semiconductor switching element 6 in the above-explained respective modes 1 to 6. The first semiconductor switching element 6 which had been conducted from a time instant "t0" (accordingly, voltage between emitter and collector of first semiconductor switching element 6 becomes zero in (b) of FIG. 4) has been turned OFF (namely current becomes zero) at an ending time instant "t1" of the mode 1.

On the other hand, (d) shows a voltage waveform of the second semiconductor switching element 7. The second semiconductor switching element 7 which has been turned OFF from the time instant "t0" is continued to be turned OFF until a starting time instant "t2" of the mode 3 in which an ON signal is applied.

As a consequence, in a time period "DT1" defined from the time instant "t1" up to the time instant "t2", both the first semiconductor switching element 6 and the second semiconductor switching element 7 are commonly turned OFF.

This time period DT1 corresponds to a minimum value which is required for the dead time. A maximum value of the dead time corresponds to a time period defined from the time instant t1 up to the time instant t3. Thus, the dead time is allowed within this time range.

Similarly, such a time period "DT2" corresponds to a minimum value which is required for the dead time. This time period "DT2" is defined by that after the second semiconductor switching element 7 is turned OFF (namely, current becomes zero) at a time instant "t4" (see (c) of FIG. 4), until an ON signal is applied to the first semiconductor switching element 6 at a starting time instant "t5" of the mode 6 as represented in (a) of FIG. 4. A maximum value of the dead time corresponds to such a time period from the time instant "t4" up to a time instant "t6". Thus, the dead time is allowed within this time range.

In the conventional 2-transistor type inverter circuit, these dead times "DT" have been defined as the time period "DT1" and the time period "DT2" in such a manner that such a time range is calculated where the turn-ON and turn-OFF operations of the first semiconductor switching element 6 are not overlapped with those of the second semiconductor switching element 7. These time periods DT1 and DT2 have been calculated as fixed values.

DISCLOSURE OF THE INVENTION

Problem to be Solved by the Invention

As will be explained later, in the case of an inverter circuit for a microwave oven, however, when the inverter circuit is driven in a range of a high frequency, a time duration after one semiconductor switching element is turned OFF until a voltage Vce between an emitter and a collector of another semiconductor switching element is decreased to 0 V is prolonged. As a consequence, after one semiconductor switching element has been turned OFF, and the fixed dead time has passed, if a turn-ON signal is applied to the other switching element, then the other semiconductor switching element is turned ON while the voltage Vce between the emitter and the collector is not decreased to 0 V. The following fact can be revealed. That is, when the switching frequency is high, a heat loss may be produced in the semiconductor switching elements. In other words, even while one semiconductor switching element is turn OFF, when the two semiconductor switching elements are driven in the high frequency range, the time constant is prolonged. As a result, since the turn-ON signal is entered to the other semiconductor switching element while the voltage Vce between the emitter and the collector of the other semiconductor switching element is not decreased to 0 V, the heat loss may be produced, and furthermore, a spike current may be produced, so that this spike current may constitute a noise generating source.

The reason why the above-explained heat loss and noise are produced will now be explained with reference also to FIG. 4.

That is, even when the first semiconductor switching element 6 is turned OFF (namely, current becomes zero) in the time instant t1 (see (a) of FIG. 4), such a time duration defined by subtracting the time instant "t1" from the time instant "t2" is required in order that the voltage (solid line) across both the terminals of the second semiconductor switching element 7 is dropped to 0 V (see (d) of FIG. 4). As a result, when the turn-ON signal is applied to the other semiconductor switching element 7 at the time instant t2, since the voltage Vce between the emitter and the collector of the second switching element 7 has been decreased to 0 V, this second semiconductor switching element 7 is turned ON (becomes conductive) from the voltage of 0 V (this operation is referred to as "zero volt switching" operation). As a consequence, there is no problem as to the heat loss and the noise.

However, an inclination of the voltage VDC is changed in response to a strength of resonance. If the resonance is strong (namely, frequency is low), then the inclination becomes sharp, so that the voltage across both the terminals of the first semiconductor switching element 7 quickly becomes zero volt. If the resonance is weak (namely, frequency is high), then the inclination becomes gentle, so that a lengthy time is required in order that the voltage across both the terminals of the first semiconductor switching element 7 is lowered to zero volt. As previously explained, when the inverter circuit is operated in the high frequency range, the switching frequency is separated apart from the resonant frequency, so that the time constant is prolonged, and in (d) of FIG. 4, a time duration becomes long during which the voltage (indicated by dot line) across both the terminals of the other (second) semiconductor switching element 7 is decreased to 0 V. Thus, this voltage cannot be completely decreased to 0 V during a time period between the time instant t1 and the time instant t2, but even after the time instant t2 has elapsed, a predetermined voltage (refer to symbol Vt2 of dot line F in (d) of FIG. 4) is still applied to this second semiconductor switching element 7.

As a consequence, when the turn-ON signal is applied to the second semiconductor switching element 7 at the time instant "t2" in accordance with the normal operation manner, this second semiconductor switching element 7 is turned ON while the predetermined voltage Vt2 is being still applied between the emitter and the collector of this second semiconductor switching element 7, so that the heat loss has been produced. Also, the steep spike current may flow due to an occurrence of a large dv/dt, which causes the noise source.

Even when such a hard switching operation (namely, switching operation is forcibly carried out even when either voltage or current is not zero) is carried out, since the dead time is secured, this hard switching operation never conducts such a failure that the power supply is short circuited, but an extra heat loss may be merely produced in the IGBT. However, since these heat losses are cooled by a heat sink, even when such heat losses may occur, the inverter operation could be continuously carried out under the normal condition.

Also, the noise caused by the spike current could not become a considerably large noise value as a serious problem.

Accordingly, in the conventional inverter circuits, the failure as to the above-described hard switching operation never causes the problem.

The present invention is featured by paying an attention to this problem which could not be considered in the conventional inverter circuits.

That is, an extra heat loss is produced in a semiconductor switching element, which may imply that useless energy is consumed in this semiconductor switching element, and therefore, it is not a desirable aspect as to saving of energy. Furthermore, since the extra heat loss may give an adverse influence to the lifetime of the semiconductor switching elements, another drawback is provided. Also, since currently available ICs and CPUs are driven in response to very low-leveled signals, there is such a future problem caused by an occurrence of noise. Under such a circumstance, the present invention has been made so as to solve these drawbacks and problems.

As a consequence, an object of the present invention is to provide an inverter circuit capable of giving no adverse influence to a lifetime of a semiconductor switching element and also which can hardly produce noise, while a heat loss can hardly occur in the semiconductor switching element, and thus, useless energy is not consumed in this semiconductor switching element.

Furthermore, in such a case that an inverter circuit equipped with a DT (dead time) is obtained which can hardly give the adverse influence to the above-described lifetime of the semiconductor switching element and can hardly produce the noise, when a frequency is largely increased, there is a problem that such a signal for turning ON an IGBT is not completely outputted. Also, there are some possibilities that when an IGBT is controlled in a duty ratio control manner, a signal for turning ON the IGBT is not completely outputted, and thus, the IGBT is destroyed.

As a consequence, a secondary object of the present invention is to provide a high frequency heating apparatus capable of preventing destruction of an IGBT in such a case that an inverter circuit equipped with a DT (dead time) is obtained which can hardly produce noise. That is, even when a frequency is largely increased and also the IGBT is controlled in a duty ratio control manner, the IGBT is necessarily turned ON under limited condition for this IGBT.

Means for Solving Problem

To solve the above-described problem, a high frequency heating apparatus, recited in Claim 1 of the present invention, is featured by that in a high frequency heating apparatus for driving a magnetron, comprising: a DC power supply; a series circuit constituted by two pieces of semiconductor switching elements; a resonant circuit in which a primary winding of a leakage transformer and a capacitor are connected, the series circuit being connected parallel to the DC power supply, and one end of the resonant circuit being connected to a center point of the series circuit and the other end of the resonant circuit being connected to one end of the DC power supply in an AC equivalent circuit; driving means for driving the semiconductor switching elements respectively; rectifying means connected to a secondary winding of the leakage transformer; and the magnetron connected to the rectifying means; the high frequency heating apparatus is further comprised of: a variable dead time forming circuit for varying a dead time during which the respective semiconductor switching elements are simultaneously turned OFF in response to a switching frequency; and a limitation is provided under which the dead time is not further widened when the switching frequency is increased.

A high frequency heating apparatus, recited in Claim 2 of the present invention, is featured by that in a high frequency heating apparatus for driving a magnetron, comprising: a DC power supply; two sets of series circuits, each of the series circuits being constituted by two pieces of semiconductor switching elements; a resonant circuit in which a primary winding of a leakage transformer and a capacitor are connected, the two sets of series circuits being connected parallel to the DC power supply respectively, and one end of the resonant circuit being connected to a center point of the one series circuit and the other end of the resonant circuit being connected to a center point of the other series circuit; driving means for driving the semiconductor switching elements respectively; rectifying means connected to a secondary winding of the leakage transformer; and the magnetron connected to the rectifying means; the high frequency heating apparatus is further comprised of: a variable dead time forming circuit for varying a dead time during which the respective semiconductor switching elements are simultaneously turned OFF in response to a switching frequency; and a limitation is provided under which the dead time is not further widened when the switching frequency is increased.

A high frequency heating apparatus, recited in Claim 3 of the present invention, is featured that in a high frequency heating apparatus for driving a magnetron, comprising: a DC power supply; a series circuit constituted by two pieces of semiconductor switching elements; a resonant circuit in which a primary winding of a leakage transformer and a capacitor are connected, the series circuit being connected parallel to the DC power supply, and the resonant circuit being connected to one of the semiconductor switching elements in a parallel manner; driving means for driving the semiconductor switching elements respectively; rectifying means connected to a secondary winding of the leakage transformer; and the magnetron connected to the rectifying means; the high frequency heating apparatus is further comprised of: a variable dead time forming circuit for varying a dead time during which the respective semiconductor switching elements are simultaneously turned OFF in response to a switching frequency; and a limitation is provided under which the dead time is not further widened when the switching frequency is increased.

A high frequency heating apparatus, recited in Claim 4 of the present invention, is featured by such a high frequency heating apparatus as recited in any one of Claims 1 to 3, in which the variable dead time forming circuit increases the dead time in connection with an increase of a switching frequency.

A high frequency heating apparatus, recited in Claim 5 of the present invention, is featured by such a high frequency heating apparatus as recited in Claim 4, in which the variable dead time forming circuit makes the dead time constant, or slightly increases the dead time at a switching frequency which is lower than, or equal to a predetermined switching frequency.

A high frequency heating apparatus, recited in Claim 6 of the present invention, is featured by such a high frequency heating apparatus as recited in Claim 5, in which the variable dead time forming circuit rapidly increases the dead time at a switching frequency which is higher than, or equal to a predetermined switching frequency.

A high frequency heating apparatus, recited in Claim 7 of the present invention, is featured by such a high frequency heating apparatus as recited in Claim 5, in which either the constant value or the slightly increased value as to the dead time is variable at the switching frequency lower than, or equal to the predetermined switching frequency is variable.

A high frequency heating apparatus, recited in Claim 8 of the present invention, is featured by such a high frequency heating apparatus as recited in Claim 6, in which the rapidly increased value as to the dead time is variable at the switching frequency higher than, or equal to the predetermined switching frequency is variable.

A high frequency heating apparatus, recited in Claim 9 of the present invention, is featured by such a high frequency heating apparatus as recited in Claim 5, or Claim 6, in which the predetermined frequency is variable.

A high frequency heating apparatus, recited in Claim 10 of the present invention, is featured by such a high frequency heating apparatus as recited in any one of Claims 1 to 3, in which the variable dead time forming circuit increases the dead time in a step manner in connection with an increase of a switching frequency.

A high frequency heating apparatus, recited in Claim 11 of the present invention, is featured by such a high frequency heating apparatus as recited in any one of Claims 1 to 10, in which the variable dead time forming circuit forms the dead time based upon both a plus offset voltage and a minus offset voltage, which are changed in a first inclination which is directly proportional to an increase of the switching frequency, and also, which are changed in a second inclination from the predetermined switching frequency.

A high frequency heating apparatus, recited in Claim 12 of the present invention, is featured by such a high frequency heating apparatus as recited in any one of Claims 1 to 11, in which the variable dead time forming circuit is comprised of: a VCC power supply; a duty control power supply; a first current which is changed directly proportional to a switching frequency; a second current which flows from the predetermined switching frequency and is changed directly proportional to the switching frequency; a third current which is produced by combining the first current with the second current and by multiplying the combined current by a predetermined coefficient; and upper/lower potential forming means for forming an upper potential and a lower potential, which are made by adding both a plus offset voltage and a minus offset voltage which are directly proportional to the third current to the voltage of the duty control power supply; and the variable dead time forming circuit forms the dead time based upon the upper potential and the lower potential.

A high frequency heating apparatus, recited in Claim 13 of the present invention, is featured by such a high frequency heating apparatus as recited in Claim 12, in which either an input power control operation or an input current control operation is carried out by changing at least one of the voltage of the duty control power supply and the switching frequency.

A high frequency heating apparatus, recited in Claim 14 of the present invention, is featured by that in a high frequency heating apparatus for driving a magnetron, which is arranged by a frequency control type resonant inverter circuit having at least one arm including a plurality of semiconductor switching elements, the high frequency heating apparatus is further comprised of: a variable dead time forming circuit for varying a dead time during which the respective semiconductor switching elements are simultaneously turned OFF in response to a switching frequency; and the variable dead time forming circuit forms the dead time based upon both a plus offset voltage and a minus offset voltage, which are changed in a first inclination which is directly proportional to an increase of the switching frequency, and also, which are changed in a second inclination from the predetermined switching frequency.

EFFECT OF THE INVENTION

Since the above-described arrangement is employed, such an inverter circuit can be obtained in which a heat loss can be hardly produced in an IGBT, and thus, useless energy is not consumed, and also, noise can be hardly generated.

BRIEF DESCRIPTION OF THE DRAWINGS

FIG. 4 shows a voltage/current waveform diagram as to the semiconductor switching elements employed in the circuit of FIG. 2.

FIG. 6(*b*) is a diagram for explaining such a basic idea that even when a frequency is changed, a dead time DT is not changed in a range where the frequency is low.

FIG. 10(*a*) shows an example in which the dead time DT is set to a constant, or is slightly increased at frequencies lower than, or equal to a frequency f1, and the dead time DT is rapidly increased at frequencies higher than, or equal to a predetermined switching frequency f1.

FIG. 10(*b*1) is a modified example in which both the constant value and the rapidly increased value of the dead time DT are varied in upper/lower directions.

FIG. 10(*b*2) is a modified example in which an inclination at the frequency f1 is varied.

FIG. 10(*b*3) is a modified example in which a frequency of an inflection point is movable along right/lower directions.

DESCRIPTION OF REFERENCE NUMERALS

1 DC power supply;
2 leakage transformer;
3 primary winding;
4 first capacitor;
5 second capacitor;
6 first semiconductor switching element;
7 second semiconductor switching element;
8 driving unit;
9 secondary winding;
10 full-wave doubler rectifying circuit;
11 magnetron;
12 thirdly winding;
13 third capacitor;
21 control signal forming circuit;
22 frequency modulated signal forming circuit;
23 triangular wave carrier oscillating circuit;
24 variable dead time forming circuit;
240 dead time limit circuit;
25 rectangular wave forming circuit;
26 switching element driving circuit;

BEST MODE FOR CARRYING OUT THE INVENTION

Figure 5:
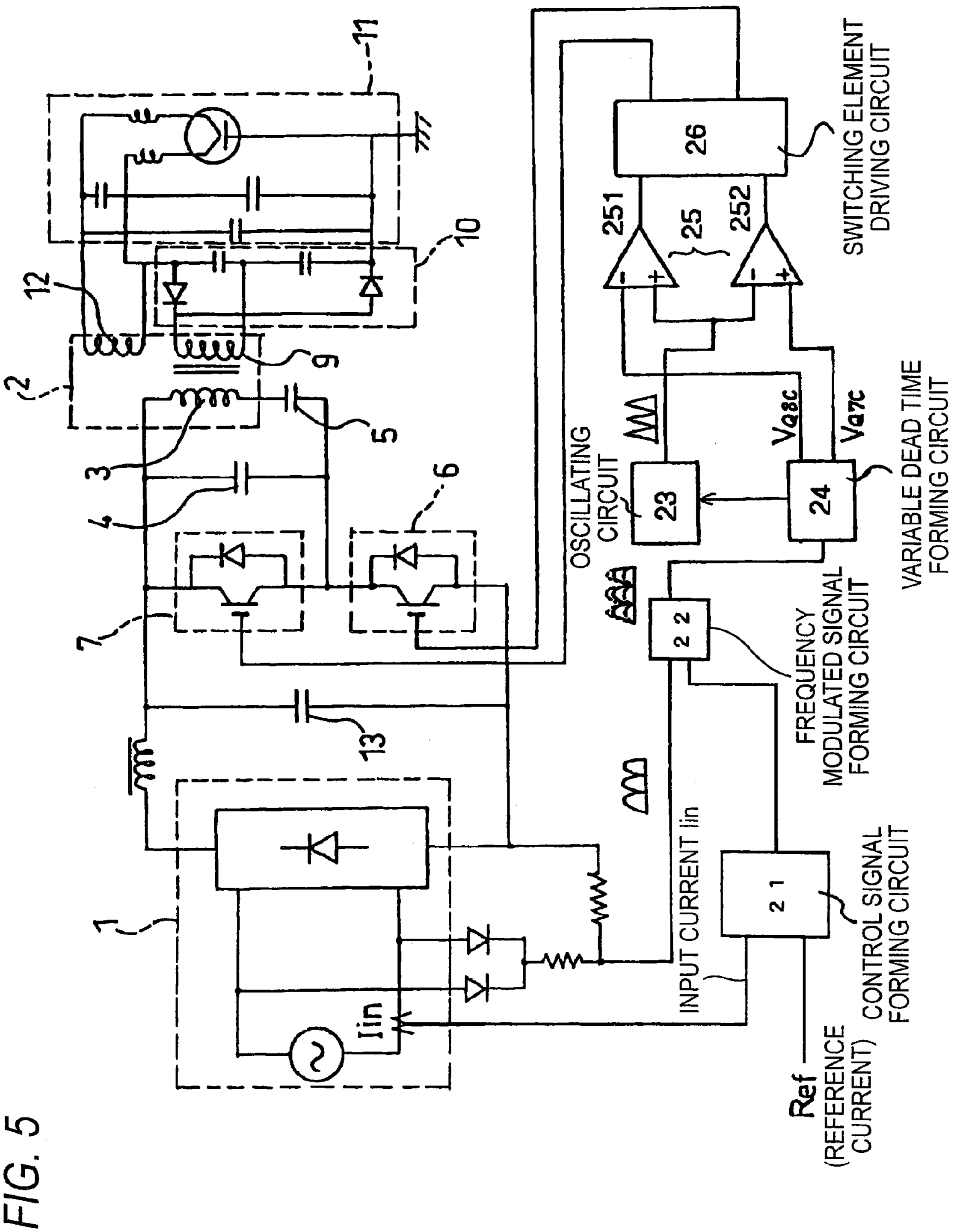
FIG. 5 is a diagram for indicating a high frequency heating apparatus driven by switching elements of a 2-switching element bridge, according to the present invention.

FIG. 5 is a diagram for showing a high frequency heating apparatus driven by switching elements of a 2-switching element bridge, according to the present invention.

Figure 2:
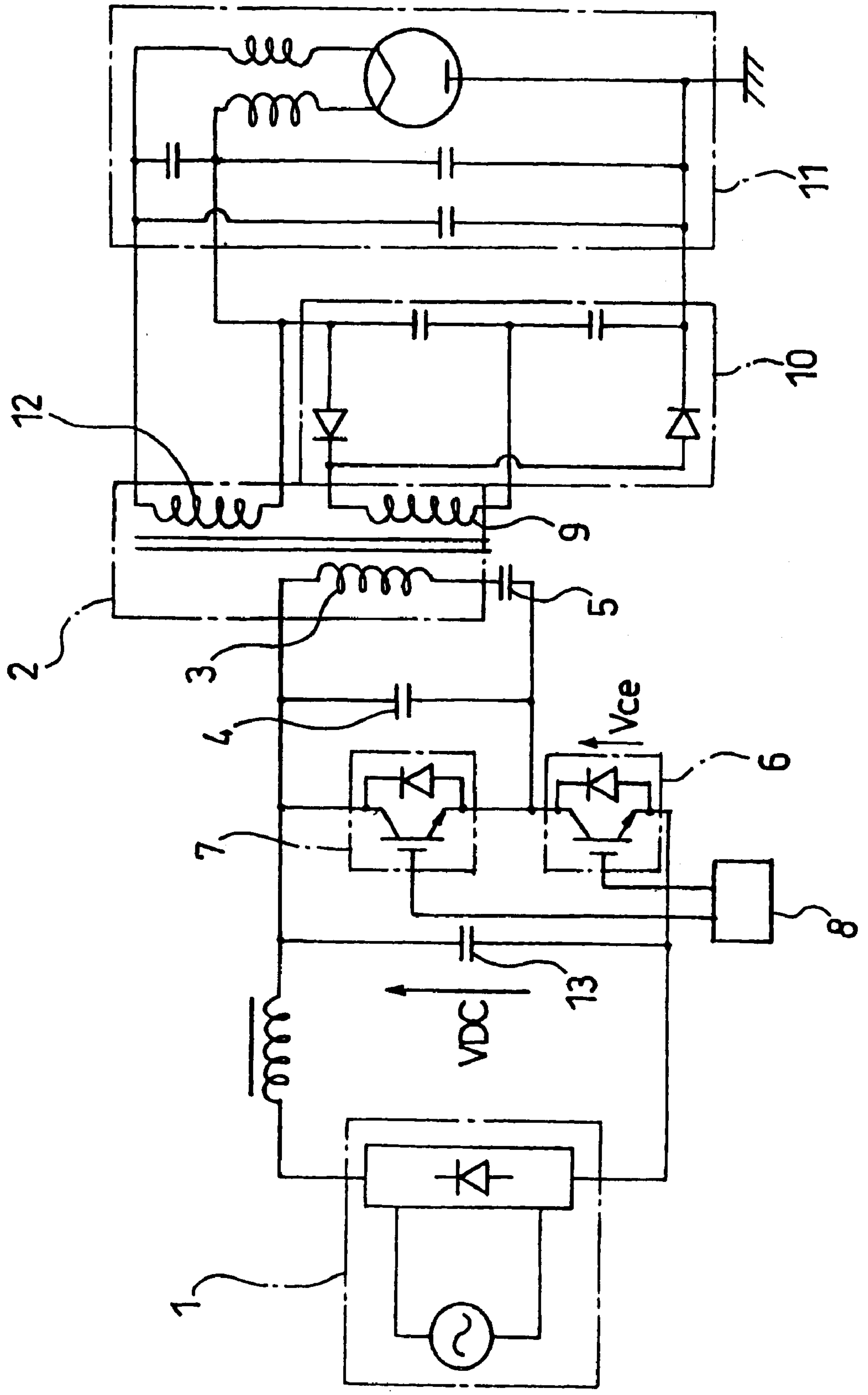
FIG. 2 is a circuit diagram for showing an example of the resonant type high frequency heating apparatus driven by the switching elements of the 2-switching element bridge, described in patent publication 1.

In this drawing, a major circuit of this high frequency heating apparatus has been arranged by a DC power supply 1, a leakage transformer 2, a first semiconductor switching element 6, a first capacitor 4, a second capacitor 5, a third capacitor (smoothing capacitor) 13, a second semiconductor switching element 7, a driving unit 8, a full-wave doubler rectifying circuit 10, and a magnetron 11. Since the arrangement of the major circuit shown in FIG. 5 is identical to that of FIG. 2, the same explanations are omitted.

Then, a control circuit for controlling the first and second semiconductor switching elements 6 and 7 is arranged by a control signal forming circuit 21, a frequency modulated signal forming circuit 22, an oscillating circuit 23, a variable dead time forming circuit 24, a rectangular wave forming circuit 25, and a switching element driving circuit 26. The control signal forming circuit 21 calculates a difference from an input current "Iin" and a reference current "Ref." The frequency modulated signal forming circuit 22 forms a frequency modulated signal from both the difference signal of the control signal forming circuit 21 and an AC full-wave rectified signal. The oscillating circuit 23 produces a triangular wave carrier wave from the frequency modulated signal of the frequency modulated signal forming circuit 22. The variable dead time forming circuit 24 is provided in accordance with the present invention, and varies a dead time based upon a magnitude of a switching frequency. The rectangular wave forming circuit 25 forms each of rectangular waves based upon the triangular wave outputted from the oscillating circuit 23 and each of outputs "VQ7C" and "VQ8C" of the variable dead time forming circuit 24. The switching element driving circuit 26 generates such a pulse for turning ON/OFF a switching element by the rectangular wave outputted from the rectangular wave forming circuit 25. The respective pulse outputs of the switching element driving circuit 26 are applied to the gates of the switching elements (IGBTs) 6 and 7.

It should be understood that in the control signal forming circuit 21, as indicated in this drawing, both the input current Iin and the reference current Ref are inputted so as to employ this difference current. Although not shown in the drawing, the control signal forming circuit 21 may be alternatively constituted in combination with such a function. That is, in order to avoid an application of an excessively large voltage to a magnetron which is under non-oscillation condition, namely under such a condition that an input current of this magnetron is very small, both a voltage which is applied to the magnetron and a reference voltage are inputted to the control signal forming circuit 21, and then, the voltage to be applied to the magnetron may be controlled by employing a difference voltage.

Collector voltages of such transistors Q8 and Q7 are transferred from the variable dead time forming circuit 24 to the rectangular wave forming circuit 25 respectively (FIG. 5). Also, the triangular wave outputted from the oscillating circuit 23 is transferred to the rectangular wave forming circuit 25.

While the rectangular wave forming circuit 25 contains two sets of comparators 251 and 252, the collector voltage VQ8C of the transistor Q8 is applied to an inverting input terminal (−) of the comparator 251; the collector voltage VQ7C of the transistor Q7 is applied to a noninverting input terminal (+) of the comparator 252; and the triangular wave output of the oscillating circuit 23 is applied to both a noninverting input terminal (+) of the comparator 251 and an inverting input terminal (−) of the comparator 252.

Each of these comparators 251 and 252 is operated in such a manner that when a potential at the noninverting input terminal (+) is lower than a potential of the inverting input terminal (−), the relevant comparator produces no output (namely, no potential), whereas while the potential at the noninverting input terminal (+) exceeds the potential at the inverting input terminal (−), the relevant comparator produces an output (namely, high potential).

Figures 6A, 6B:
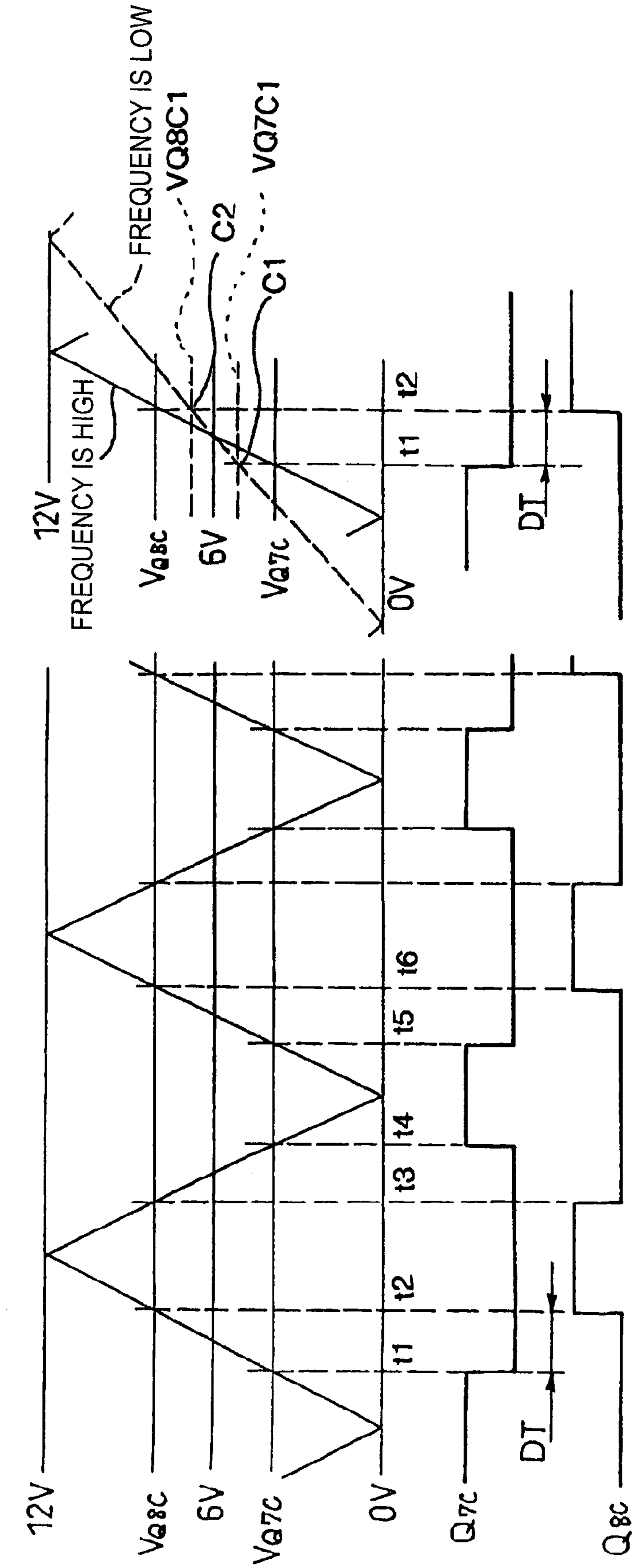
FIG. 6(*a*) is a diagram for explaining a relationship between respective outputs of an oscillating circuit and of a variable dead time forming circuit, and an output of a rectangular wave forming circuit.

FIG. 6 is a diagram for explaining a basic idea of forming a dead time; FIG. 6(*a*) is a diagram for explaining a relationship between the respective outputs of the oscillating circuit 23 and of the variable dead time forming circuit 24 and the output of the rectangular wave forming circuit 25; and FIG. 6(*b*) is a diagram for explaining such a basic idea that even when a frequency is changed, a dead time DT is not changed in a range where the frequency is low.

In FIG. 6, in a time period before a time instant "t1", in the comparator 252 (refer to FIG. 5), since a potential VQ7C of the noninverting input terminal (+) exceeds a potential of the triangular wave of the inverting input terminal (−), the semiconductor switching element has been turned ON (output 1). At the same time, in the comparator 251, since a potential of the triangular wave of the noninverting input terminal (+) lower than a potential VQ8C of the inverting input terminal (−), the semiconductor switching element has been turned OFF (output 0).

(1). At the time instant t1, since the potential VQ7C of the noninverting input terminal (+) becomes lower than the potential of the triangular wave of the inverting input terminal (−), the comparator 252 produces an output 0.

(2). In a time period from t1 to t4, the comparator 252 continuously produces the output 0.

(3). At a time instant t2, since the potential of the triangular wave of the noninverting input terminal (+) becomes higher than the potential VQ8C of the inverting input terminal (−), the comparator 251 produces the output 1.

(4). In a time period from the time instants t2 to t3, the comparator 251 continuously produces the output 1.

(5). At a time instant t3, since the potential of the triangular wave of the noninverting input terminal (+) becomes lower than the potential VQ8C of the inverting input terminal (−), the comparator 251 produces the output 0.

(6). At the time instant t4, since the potential VQ7C of the noninverting input terminal (+) becomes higher than the potential of the triangular wave of the inverting input terminal (−), the comparator 252 produces the output 1.

(7). In a time period from the time instants t4 to t5, the comparator 252 continuously produces the output 1.

(8). At the time instant t5, since the potential VQ7C of the noninverting input terminal (+) becomes lower than the potential of the triangular wave of the inverting input terminal (−), the comparator 252 produces the output 0.

(9). In a time period from the time instants t3 to t6, the comparator 251 continuously produces the output 0.

These comparators 251 and 252 will repeat similar operations subsequently.

The outputs of the comparators 251 and 252 are applied to the switching element (IGBT) driving circuit 26, and the switching elements 6 and 7 are turned ON and OFF at the same timing.

As previously explained, the time periods t1 to t2, t3 to t4, and t5 to t6, during which the switching elements 6 and 7 are simultaneously turned OFF, are obtained as a "dead time DT."

In the prior art system, the time period of the dead time DT is constant (namely, fixed) irrespective of the frequency. The present invention is featured by that this dead time DT is varied in response to a switching frequency. That is, when the switching frequency is lower than a predetermined switching frequency "f1", the dead time DT is set to a preselected non-changed value (otherwise, slightly increased value), whereas when the switching frequency is higher than the predetermined switching frequency f1, the dead time DT is increased.

As a consequence, a description is made of such a basic idea that when the switching frequency is lower than the predetermined switching frequency f1, the dead time DT becomes the predetermined non-changed value with reference to FIG. 6(*b*).

In this drawing, when the switching frequency is high (indicated by solid line), as previously explained in FIG. 6(*a*) by employing the potentials VQ8C and VQ7C of the solid lines and the triangular wave, such a time period between the time instant t1 and the time instant t2 may be secured as the dead time DT between the potentials VQ8C and VQ7C, and the triangular wave. At the time instant t1, the potential VQ7C becomes lower than the potential of the triangular wave, and the comparator output becomes 0. At the time instant t2, the potential of the triangular wave becomes higher than the potential VQ8C, and the comparator output becomes 1.

Then, when the switching frequency becomes low, the above-described triangular wave as shown by the solid line becomes a triangular wave as indicated by a dot line, and an inclination of this triangular wave becomes gentle. As a consequence, in accordance with the present invention, in order to obtain the same dead time DT as the above-explained dead time DT, the respective offset voltages are determined in such a manner that the potentials of the triangular wave may become such potentials "VQ7C1" and "VQ8C1" which pass through cross points "C1" and "C2" with respect to perpendiculars which are drawn from the time instant t1 and the time instant t2 toward the triangular wave indicated by the dot line. Since resistors R1 and R7 (see FIG. 7) are constant resistance values, currents "I8" and "I7" which may produce such offset voltages are supplied to the respective resistors R8 and R7.

Since the above-described switching operation is carried out, even when the switching frequency is changed so that the triangular wave is changed from the wave indicated by the solid line to the wave indicated by the dot line, the time instant t1 and the time instant t2, at which the triangular wave indicated by the dot line intersects the two potentials VQ7C1 and VQ8C1, may become the same time instants of the above-explained triangular wave indicated by the solid line. As a result, this dead time DT is the same as the above-explained dead time DT.

Figure 7:
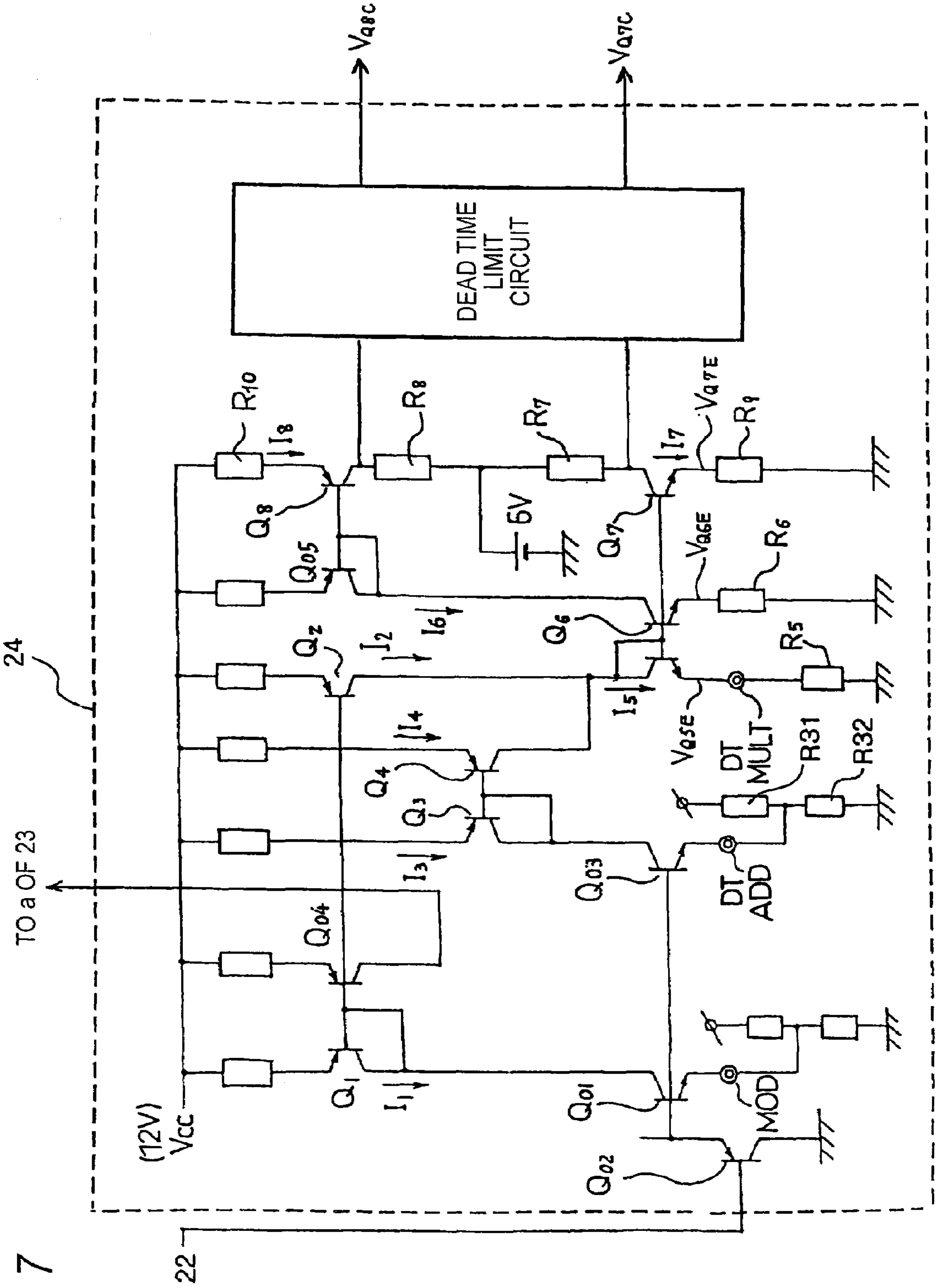
FIG. 7 is a circuit diagram for showing a concrete example of the variable dead time forming circuit according to the present invention.

FIG. 7 is a circuit diagram for showing a concrete example as to the variable dead time forming apparatus 24 according to the present invention.

Figure 12:
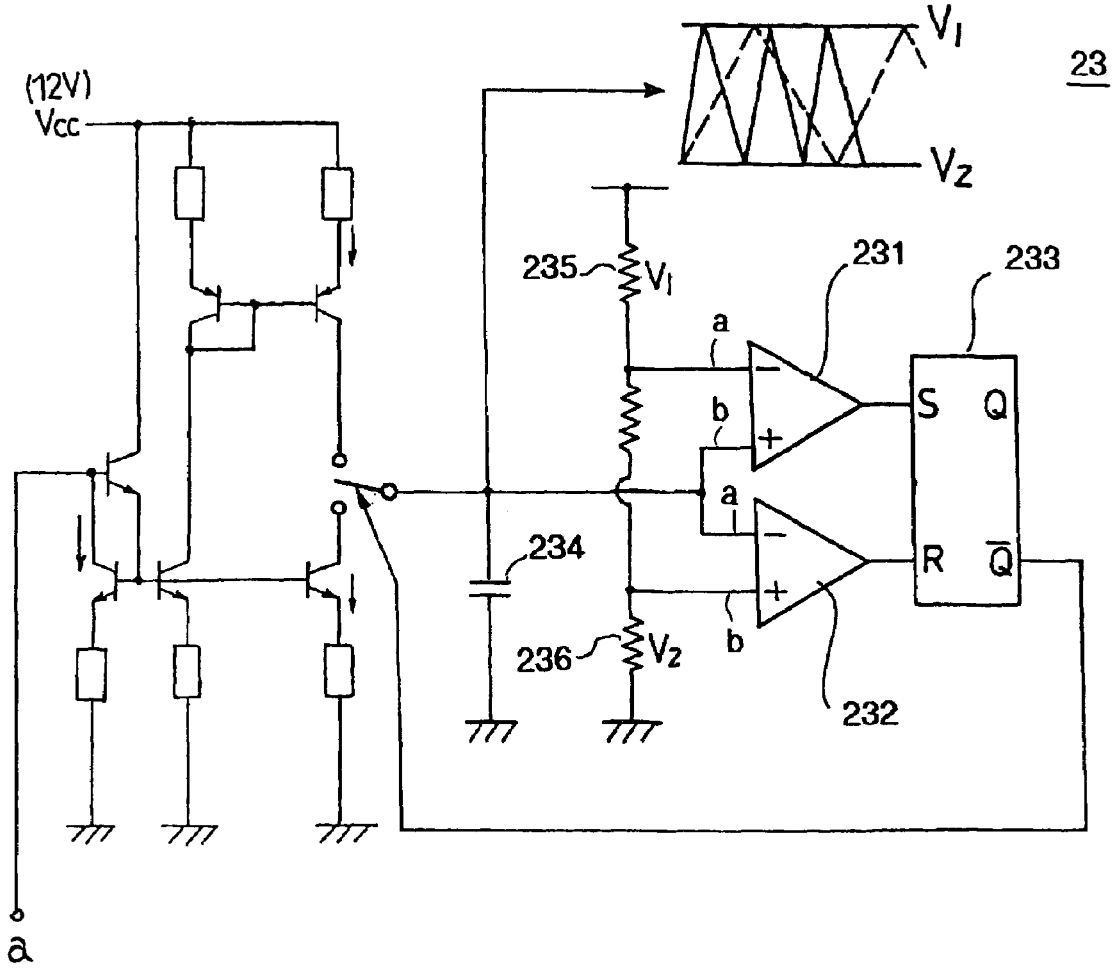
FIG. 12 is a diagram for indicating one example of the oscillating circuit of FIG. 5.

In this drawing, symbols Q01, Q02, and Q1 to Q8 show transistors; and symbols R1 to R10 indicate resistors. It is so assumed that currents flowing through the transistors Q1, Q3, Q4, Q5, Q6, Q7, and Q8 are defined as I1, I3, I4, I5, I6, I7, and I8, respectively; emitter potentials of the transistors Q5, Q6, Q7 are defined as VQ5E, VQ6E, VQ7E, respectively; and also, collector potentials of the transistors Q7 and Q8 are defined as VQ7C and VQ8C, respectively. A current mirror circuit has been constituted by the transistors Q1 and Q2. Similarly, a current mirror circuit has been constituted by the transistors Q1 and Q04; a current mirror circuit has been formed by the transistors Q3 and Q4; and a current mirror circuit has been formed by the transistors Q05 and Q8. An output of the transistor Q04 is supplied to the oscillating circuit 23 (FIG. 12).

Also, the emitter sides of the transistors Q1 and Q3 have been connected to Vcc, and the collector sides thereof have been connected to the collector sides of the transistors Q01 and Q03 respectively; the emitter sides of the transistors Q01 and Q03 have been connected to a terminal "MOD" and a terminal "DTADD" respectively; and the terminal MOD and the terminal DTADD have been grounded via voltage dividing resistors respectively. The base sides of the transistors Q01 and Q03 have been connected to the emitter side of the transistor Q02, and the collector side of the transistor Q02 has been grounded. A control voltage of an oscillation frequency which corresponds to the output of the frequency modulated signal forming circuit 22 (see FIG. 5) is applied to the base of the transistor Q02.

A series connection circuit made of a resistor R10, a resistor R8, a resistor R7, and a resistor R9 has been provided between the power supply voltage VCC (in this circuit, 12 V) and the earth from the Vcc side. Also, the transistor Q8 has been provided between the resistor R10 and the resistor R8, while the emitter side thereof is connected to the resistor R10 and the collector side thereof is connected to the resistor R8. Also, the transistor Q7 has been provided between the resistor R9 and the resistor R7, while the emitter side thereof is connected to the resistor R9 and the collector side thereof is connected to the resistor R7. A voltage of ½ Vcc (in this circuit, 6V) has been applied between the resistor R8 and the resistor R7. While this voltage 6 V is set as a center voltage, a voltage drop of the resistor R8 at the upper side is I8×R8, and a voltage drop of the resistor R7 at the lower side is I7×R7. Both the current I8 and the current I7 are varied, depending upon a frequency. As a result, the voltage drops for the resistors R7 and R8 are varied in response to the frequency, so that while the voltage of 6 V is set as the center, both the offset voltages VQ8C and VQ7C are varied.

A base voltage of the transistor Q05 which constitutes the current mirror circuit is applied to the base of the transistor Q8. If the respective characteristics of the transistors Q05 and Q8 are equal to each other and the respective resistance values thereof are also equal to each other, then the following equations are given:

I6=I7=I8, I3=I4. Note that the present invention is not limited only to I1=I2, I3=I4, I6=(I7=I8), but may be modified. Namely, these currents may have a direct relationship.

It should be noted that the condition of I7=I8 is required.

Next, a description is made of operations of the variable dead time forming circuit 24, namely, when the switching frequency is lower than, or equal to the predetermined switching frequency, the dead time "DT" is not changed, or is slightly changed, whereas when the switching frequency is higher than, or equal to the predetermined switching frequency, the dead time "DT" is increased.

1), The reason why the dead time DT is not changed (or slightly increased) within such a range that the current I3 does not flow (namely, a range in which oscillation frequency is low) is given as follows:

In the range where the current I3 does not flow, the following conditions can be established:

$$I1=I2=I5,$$

$$VQ5E=VQ6E=VQ7E, \text{ and}$$

$$I5*R5=I6*R6=I7*R9=I1*R5$$

The currents I8 and I7, which flow through the transistors Q8 and Q7, are given as follows:

$$I8=I6=I1*(R5/R6)$$

$$I7=I1*(R5/R9)$$

The offset voltages VR8 and VR7 are given as follows:

$$VR8=I8*R8=\{I1*(R5/R6)\}*R8$$

$$=I1*R5*(R8/R6)$$

$$VR7=I1*R5*(R7/R9)$$

Since the collector voltages VQ8C and VQ7C of the transistors 8 and 7 are calculated by adding/subtracting the above-described offset voltages VR8 and VR7 with respect to 6 V, these collector voltages are expressed by the following formula (1)=

$$VQ8C=6V+VR8=6V+I1*R5*(R8/R6)$$

$$VQ7C=6V-VR7=6V-I1*R5*(R7/R9) \quad (1)$$

As previously explained, since the currents I8 and I7 within the range where the frequency is low (dead time may be made constant) are directly proportional to the charge/discharge current I1 of the triangular wave, these currents I8 and I7 may be employed as such current values obtained by multiplying the charging/discharging current I1 of the triangular wave by several values. This may be realized by employing such a mirror circuit as shown in FIG. 7. That is, while both the currents I6 and I8 are set to a certain relationship with respect to the current I5, the current I6 is made equal to the current I8. While the current I7 is set to a certain relationship with respect to the current I5, the current I7 is made equal to the current I8.

As previously explained in FIG. 7, even when the switching frequency is changed, the dead time DT is made constant, and also the dead time DT is varied in response to the change in the frequency. Then, concretely speaking, the offset voltages VQ7C and VQ8CV across both the terminals of the resistors R7 and R8 are varied. At this time, the Inventors of the present invention could become aware of the below-mentioned problems:

That is to say, when the dead time DT is made constant, if the switching frequency is increased, then the respective offset voltages VQ7C and VQ8CV must be decreased/increased along an opening direction with respect to 6 V. This idea is explained as follows. That is, when the switching frequency is increased, in FIG. 6(*b*), the characteristic line diagram is changed from the characteristic line diagram (indicated by dot line) of "frequency=low" to the characteristic line diagram (indicated by solid line) of "frequency=high", and the characteristic line diagram is gradually raised up. As a consequence, in order to keep the dead time DT, the offset voltage VQ7C is decreased with respect to 6V, and conversely, the offset voltage VQ8C is increased with respect to 6V. Then, when the switching frequency is largely increased, the offset voltage VQ7C becomes lower than, or equal to 0 V, so that none of a signal capable of turning ON the IGBT is generated. Also, in order that the offset voltages VQ7C and VQ8C are increased and/decreased in an interconnecting manner for controlling the dead time, the center voltage of 6 V may be simply changed. Since this center voltage of 6 V is changed, a ratio of turning ON and OFF operations as to the two transistors Q8 and Q7 may be changed (namely, duty ratio control operation can be done). As a consequence, this circuit becomes effective so as to very the dead time in the case of the duty ratio control operation. However, while this center voltage of 6V is variable, when the center voltage of 6 V is lowered, both the offset voltages VQ7C and VQ8C are also lowered in the interconnecting manner. As a result, the offset voltage VQ7C becomes lower than, or equal to 0 V, so that none of a signal capable of turning ON the IGBT is generated. Therefore, in order that the IGBT may be turned ON under a predetermined limitation condition even when the switching frequency is increased and the duty ratio control operation is carried out, the present invention is featured by providing a dead time limiting circuit 240 capable of preventing destruction of the IGBT.

Figure 8:
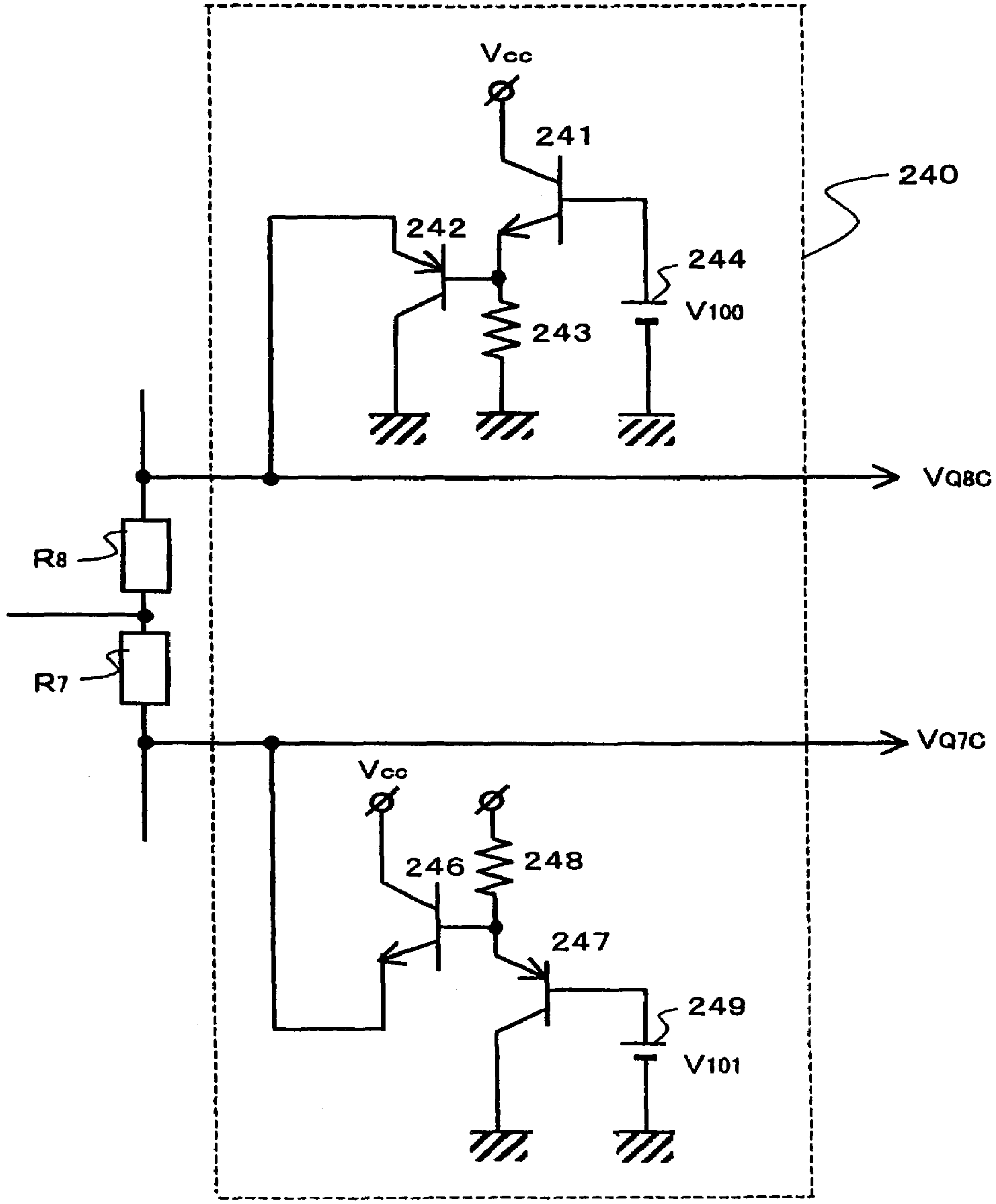
FIG. 8 is circuit diagram for indicating a concrete example of a limiter circuit provided in the variable dead time forming circuit of FIG. 7.

FIG. 8 is a circuit diagram for showing a concrete example of the dead time limit circuit 240 which is provided in the variable dead time forming circuit 24 of FIG. 7.

In this drawing, reference numeral 240 indicates an dead time limit circuit according to the present invention. The dead time limit circuit 240 is constituted by such two circuits which have been provided on the side of the offset voltage VQ7C and on the side of the offset voltage VQ8C.

First of all, on the offset VQ7C potential side of this drawing, a transistor 246 has been connected between the Vcc power supply and the offset VQ7C potential side of the resistor R7; a transistor 247 has been inserted between a base and an emitter of this transistor 246; and a battery 249 for producing a first limit voltage V101 has been inserted between a base of the transistor 247 and the earth.

When the offset voltage VQ7C is higher than the first limit voltage V101, the transistor 246 is under OFF state, and this offset voltage VQ7C may be freely varied within a range higher than the first limit voltage V101.

However, when the offset voltage VQ7C is tried to become lower than, or equal to the first limit voltage V101, the transistor 246 is brought into an ON state, so that a current starts to be replenished from the Vcc power supply, and the transistor 246 blocks that this offset voltage VQ7C is tried to become lower than, or equal to the first limit voltage V101.

On the other hand, on the offset VQ8C potential side of FIG. 8, a transistor 242 has been connected between the earth and the offset VQ8C potential side of the resistor R8; a transistor 241 has been inserted between the power supply voltage Vcc and a base of this transistor 242; and a battery 244 for producing a second limit voltage V100 has been inserted between a base of the transistor 241 and the earth.

When the offset voltage VQ8C is lower than the second limit voltage V100, the transistor 242 is under OFF state, and this offset voltage VQ8C may be freely varied within a range lower than the second limit voltage V100.

However, when the offset voltage VQ8C is tried to become higher than, or equal to the second limit voltage V100, the transistor 242 is brought into an ON state, so that a current starts to flow into the GND and the transistor 242 blocks that this offset voltage VQ8C is tried to become higher than, or equal to the second limit voltage V100.

In FIG. 8, the loads of the transistors 241 and 247 have been constituted by employing a resistor 243 and another resistor 248. Alternatively, even when these loads may be constituted by employing constant current loads instead of the resistors, a similar effect may be achieved. Also, as apparent from the foregoing explanation, the dead time limit circuit 240 according to the present invention is not limited only to the circuit arrangement and the used components, which are shown in this drawing.

As apparent from FIG. 6, it should also be noted that since the limiters are provided with respect to the offset voltages VQ7C and VQ8C, even when the switching frequency becomes high, turning ON of the IGBT can be secured. However, since an ON time width when a limiting operation is performed is directly proportional to 1/frequency, if the switching frequency is increased, then the ON time width when the limiting operation is performed becomes shorter. Thus, there is such a problem that the ON time width required for obtaining the resonant energy cannot be secured.

As a consequence, since the frequency modulated signal forming circuit 22 is provided with such a function capable of limiting an upper limit value of the switching frequency, even if the switching frequency is increased due to variations in temperatures of the magnetron 11, the switching frequency does not become higher than this upper limit frequency value.

As a consequence, even if the switching frequency becomes high, the maximum switching frequency is limited in order to secure turning-ON of the IGBT, and furthermore, the limit potential must be set to a proper limit potential in order that such an ON time width required when the maximum switching frequency is used can be obtained.

Figure 9:
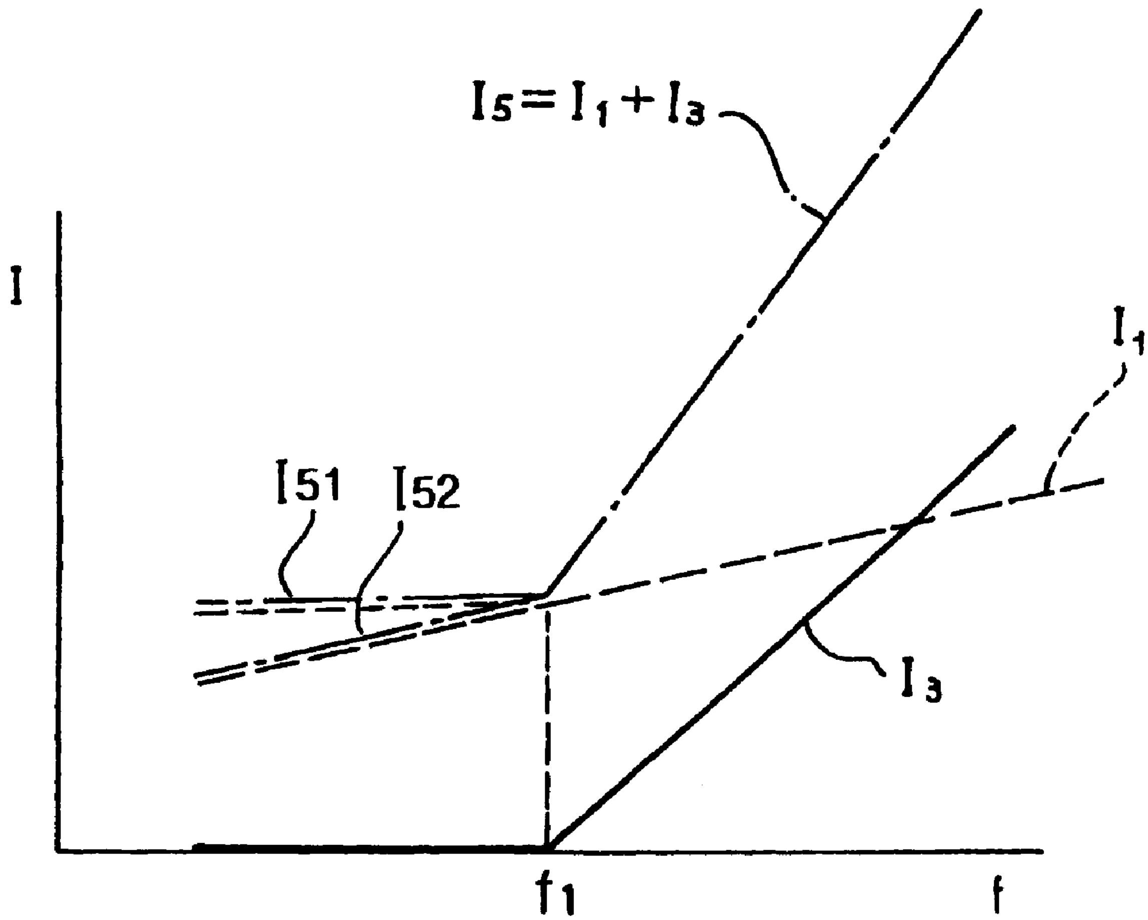
FIG. 9 is a graphic representation for showing a current-to-frequency characteristic owned by the variable dead time forming circuit.

FIG. 9 graphically shows a current-to-frequency characteristic owned by the variable dead time circuit 24 according to the present invention.

In this drawing, symbols I1, I3, I5 show currents which flow through the transistors Q1, Q3, Q5 of FIG. 7, respectively. The current I5 is equal to I1+I3.

In the range where an oscillating frequency is lower than, or equal to the predetermined switching frequency f1, the current I1(I5) becomes constant (I51), or is slightly increased (I52). In the range where an oscillating frequency is higher than, or equal to the predetermined switching frequency f1, while the predetermined switching frequency f1 is employed as the inflection point, since the current I3 sharply starts to flow, a total current I5 (=I3+I1) is rapidly increased.

As can be understood from the above-described formula (1) as to the offset voltages VQ8C and VQ7C, and also, the current-to-frequency characteristic of FIG. 9, in such a range that the oscillating frequency is low, as to VQ8C and VQ7C, offset voltages may be obtained which are directly proportional to the charging/discharging current I1 of the capacitor of the oscillating circuit 23. As a consequence, as shown in FIG. 9, if the charging/discharging current I1 becomes constant, then the dead time DT becomes constant. Also, if the charging/discharging current I1 is slightly increased, then the dead time DT is slightly increased.

2). To the contrary, in the range where the current I1 flows (namely, range where oscillating frequency is high), the dead time DT is varied. This reason is explained in the below-mentioned explanations.

In FIG. 7, in the range where the oscillating frequency is low, the current I3 is equal to 0, whereas in the range where the oscillating frequency is high, the current I3 may flow in the below-mentioned manner. In other words, when an emitter potential of the transistor Q02 of an oscillating frequency control voltage is lower than a potential at a contact point DTADD, the transistor Q3 which is connected to the terminal DTADD is not turned ON (as a result, current I3 does not flow). However, when an emitter potential of the transistor Q02 of the oscillating frequency control voltage is higher than a potential at the contact point DTADD, since the transistor Q3 which is connected to the terminal DTADD is turned ON, the current I3 starts to flow. in FIG. 9, in the range where the oscillating frequency is lower than, or equal to the predetermined switching frequency f1, the current I51 becomes constant, or the current I52, is slightly increased. In the range where the oscillating frequency is higher than, or equal to the predetermined switching frequency f1, the current I3 which has been 0 starts to rapidly flow. As a result, the current I5 is equal to I1+I3.

In the range where the current I3 flows, the below-mentioned formulae is given:

$$I5=I2+I4=I1+I3$$

$$I5*R5=I6*R6=I7*R9=(I1+I3)*R5$$

As a consequence, the collector voltages VQ8C and VQ7C of the transistors Q8 and Q7 are given by the below-mentioned formulae (2):

$$VQ8C=6V+VR8=6V+(I1+I3)*R5*(R8/R6)$$

$$VQ7C=6V-VR7=6V-(I1+I3)*R5*(R7/R9) \quad (2)$$

Figure 3:
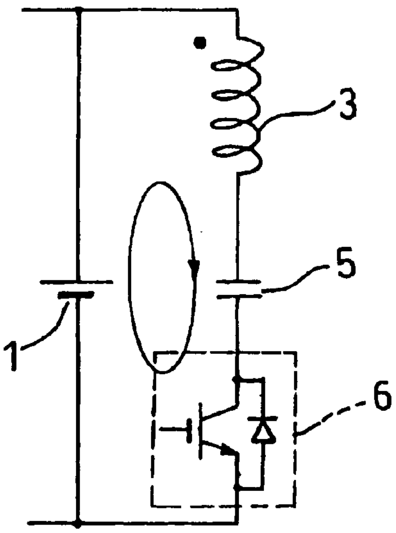
FIGS. 3(*a*) to 3(*f*) are diagrams for representing the respective modes in which the circuit of FIG. 2 is operated.
Figure 3:
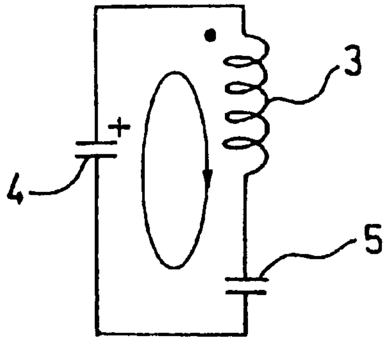
Figure 3:
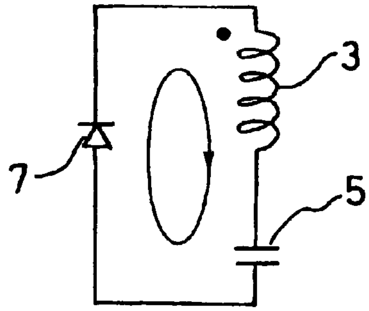
Figure 3:
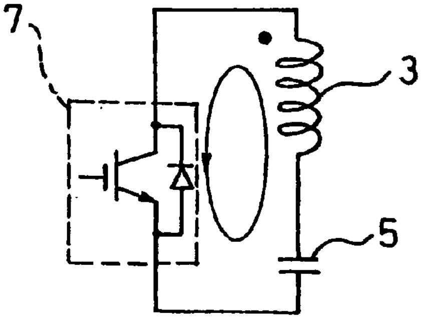
Figure 3:
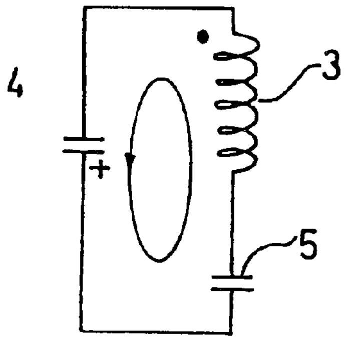
Figure 3:
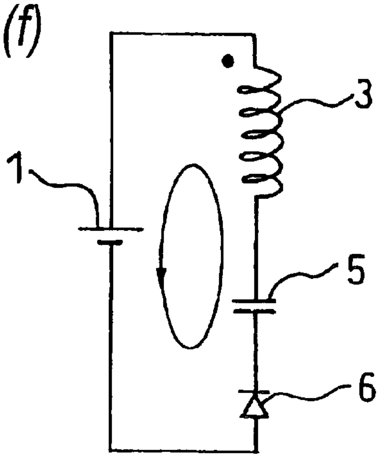

A similar effect may be achieved also in such a circuit formed by omitting the third capacitor 5 from the circuit shown in FIG. 3(*a*) by setting the capacitances as to the first capacitor 41 and the second capacitor 42 to proper capacitance values.

As can be understood from the above-explained formula (2) as to the collector voltages VQ8C and VQ7C and the relationship of FIG. 9, as to the collector voltages VQ8C and VQ7C, such offset voltages may be obtained which are commonly directly proportional to the current I3. As indicated in FIG. 9, when the current I3 is rapidly increased, since the collector potentials VQ8C and VQ7C of the transistors Q8 and Q7 become a function of the current I5 (=I1+I3), the current I5 is increased. In connection with this increase of the current I5, the collector potentials VQ8C and VQ7C of the transistors Q8 and Q7 are increased. Then, when the respective collector potentials VQ8C and VQ7C are increased, the collector potential VQ8C ascends higher than the position shown in FIG. 6, and the collector potential VQ7C descends lower than the position shown in FIG. 7, so that a cross point between the triangular wave and the collector potential VQ7C leads, which corresponds to a starting point of the dead time DT, and a cross point between the triangular wave and the collector potential VQ8C delays, which corresponds to a ending point of the dead time DT. As a result, the width of the dead time DT is made wider than the width shown in the drawing.

As previously explained, in accordance with the present invention, as represented in FIG. 10(*a*), the inverter circuit is featured by that at the switching frequency lower than, or equal to the predetermined switching frequency f1, the dead time DT is made constant (otherwise, is slightly increased, namely indicated by line diagram "L1"), whereas at the switching frequency higher than, or equal to the predetermined switching frequency f1, the dead time DT is rapidly increased (indicated by line diagram "L2"). Then, furthermore, at a limit frequency "fL", since the dead time DT is limited, the turning-ON of the IGBT in the limited condition may be secured, and the destruction of the IGBT can be avoided.

FIGS. 10(*b*1), 10(*b*2) and 10(*b*3) show modified examples of FIG. 10(*a*).

FIG. 10(*b*1) indicates such a graphic representation that either the constant value or the slightly increased value of the above-explained dead time at the switching frequency lower than, or equal to the predetermined frequency f1 of FIG. 10(*a*) is variable such as L11, L12, L13, and also, the rapidly increased value L2 of the dead time DT at the switching frequency higher than, or equal to the predetermined switching frequency f1 is variable such as L21, L22, L23.

This value varying operation may be realized by changing a ratio of the resistor R5 to the ratio R6 of the terminal "DTMULTI" of FIG. 7. In other words, since I5*R5=I6*R6, if the ratio of the resistor R5 to the resistor R6 is changed, then the ratio of the current I5 to the current I6 is also changed. Since the current I6 determines the values of the currents I7 and I8, if the ratio of the current I5 to the current I6 is changed, then the values of the currents I7 and I8 with respect to the current I5 are also changed, so that the offset voltage from 6 V is also changed. As a result, the dead time DT is also changed. If the above-explained circuit arrangement is employed, then the dead time DT may be varied even in the same frequency.

Then, moreover, the dead time "DT" is limited by the respective line diagrams L21, L22, L23 at the limit frequency fL. As a result, the turning ON of the IGBT under the limited condition can be secured, and the destruction of the IGBT can be avoided.

FIG. 10(*b*2) shows such a graphic representation that an inclination of the dead time DT is variable as L24, L25, L26 at the predetermined switching frequency f1 of FIG. 10(*a*).

This inclination is determined based upon a combined resistance value of a resistor R31 and a resistor R32 located at upper/lower positions of the contact DTADD. When the combined resistance value is large, a current slightly flows from the power supply voltage Vcc, so that the inclination of the dead time DT becomes small (L26). Conversely, when the combined resistance value is small, a current largely flows from the power supply voltage Vcc, so that the inclination of the dead time DT becomes large (L24). In other words, when the current I3 largely flows, both the currents I7 and I7 are largely increased. As a result, voltage drops across the resistors R7 and R8 are increased, and thus, the offset voltage from 6 V is increased. As a consequence, the collector voltages of the transistors Q8 and Q7 are increased in accordance with the above-explained formula (2).

It should be noted that if the oscillating frequency becomes high, then the dead time DT is effected along the narrowing direction. However, the increase of the offset voltage may be effected in such a direction along which the dead time DT may be furthermore prolonged.

Then, moreover, the dead time "DT" is limited by the respective line diagrams L24, L25, L26 at the limit frequency fL. As a result, the turning ON of the IGBT under the limited condition can be secured, and the destruction of the IGBT can be avoided.

FIG. 10(*b*3) shows a graphic representation that the predetermined switching frequency f1 which constitutes the inflection point of FIG. 10(*a*) is varied as "f0", and "f2."

This inflection point may be changed by a resistance ratio of the resistors R31 and R32 at the upper/lower positions of the terminal DTADD. In other words, when the oscillating frequency control voltage applied to the base of the transistor Q02 exceeds such a voltage which is determined by this resistance ratio, the current I3 starts to flow. As a result, this resistance ratio of the resistors R31 and R32 constitutes the inflection point. If the resistor R31>the resistor R32, then the voltage determined by the resistance ratio is low, so that the current I3 starts to flow in an earlier stage. When the current I3 flows, the currents I7 and I8 also flow, so that voltage drops across the resistors R7 and R8 may occur, an offset voltage from 6 V is increased. As a consequence, the collector voltages of the transistors Q8 and Q7 are increased in accordance with the above-explained formula (2), and the dead time DT starts to be increased in an earlier stage (f0). Conversely, if the resistor R31<the resistor R32, then the voltage determined by the resistance ratio is high. As a result, it takes a long time in order that the current I3 starts to flow, and an increase of the dead time DT is commenced in a later stage (f2).

Then, moreover, the dead time "DT" is limited by the respective line diagrams L27, L28, L29 at the limit frequency fL. As a result, the turning ON of the IGBT under the limited condition can be secured, and the destruction of the IGBT can be avoided.

Figure 11:
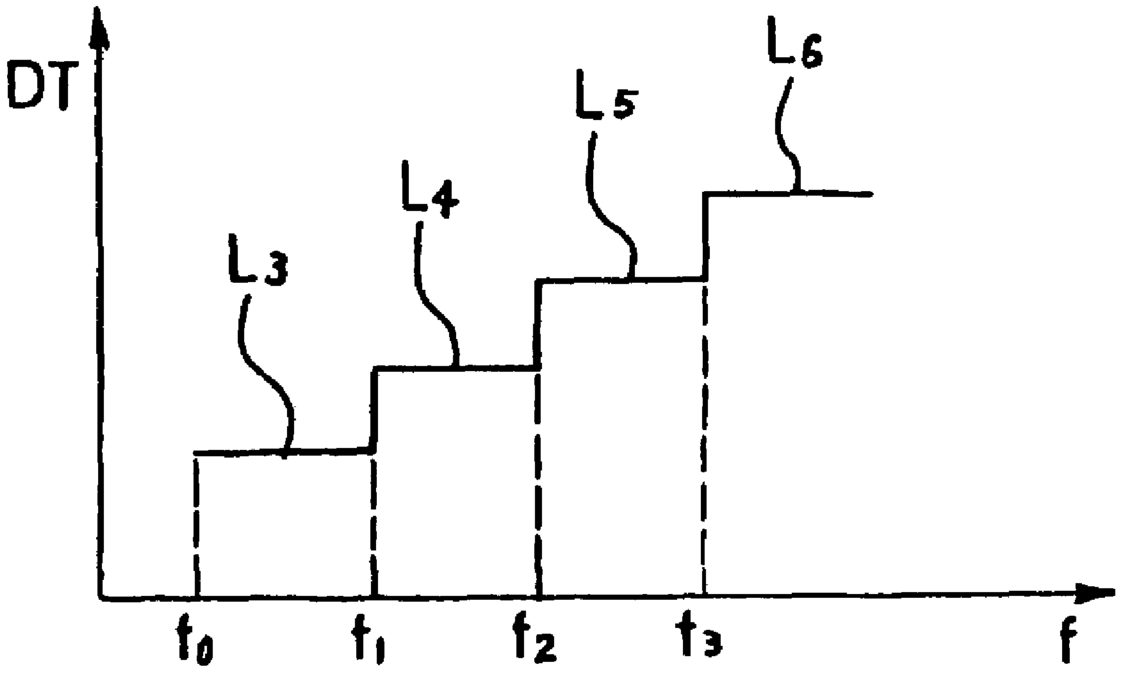
FIG. 11 is a graphic representation for explaining a second embodiment of the present invention in which a dead time DT is variable.

FIG. 11 is a graphic representation for explaining a second embodiment in which the dead time DT is variable.

In FIG. 10(*a*), while the predetermined switching frequency f1 which constitutes the inflection point is defined as the boundary point, the dead time DT becomes constant, or slightly increased at the frequency lower than, or equal to the switching frequency f1 as represented as "L1", whereas the dead time DT is rapidly increased at the frequency higher than, or equal to the switching frequency f1 as represented as "L2." In FIG. 11, in accordance with such a condition that the switching frequency is increased as f0, f1, f2, f3, the dead time DT is increased in such a step wise manner as L3, L4, L5, and L6 respectively.

This step-wise structure may be realized by employing the manner capable of forming the dead times L11, L12, L13 as explained in FIG. 10(*b*1). In other words, while the resistor R5 and the resistor R6 of the terminal DTMULTI shown in FIG. 7 are constituted by variable resistance elements such as transistors, the resistance ratio of the resistor R5 to the resistor R6 may be changed at a predetermined frequency.

FIG. 12 is a circuit diagram for indicating one example of the oscillating circuit 23 shown in FIG. 5.

The oscillating circuit 23 contains two sets of comparators 231 and 232. A voltage V1 of a voltage dividing resistor 235 is applied to a noninverting input terminal "a(−)" of the comparator 231; a voltage V2 (note that V1>V2) of a voltage dividing resistor 236 is applied to a noninverting input terminal "b(+)" of the comparator 232; and a voltage of a capacitor 234 is applied to both a noninverting input terminal "b(+)" of the comparator 231 and an inverting input terminal "a(−)" of the comparator 232.

Each of the comparators 231 and 232 outputs "0" when a potential of the noninverting input terminal "b(+)" is lower than a potential of the inverting input terminal "a(−)", and each of the comparators 231 and 232 outputs "1" while a potential of the noninverting input terminal "b(+)" exceeds a potential of the inverting input terminal "a(−)."

The outputs of the respective operational amplifiers 231 and 232 are inputted to an S terminal and an R terminal of an SR flip-flop 233. The output of a non-Q terminal of the SR flip-flop 233 constitutes a charging/discharging circuit of the capacitor 234.

Now, as indicated in FIG. 12, if a charging circuit of the capacitor 234 has been formed, then the potential at the capacitor 234 is increased. This potential of the capacitor 234 is outputted. In connection to this potential increase, the potential at the noninverting input terminal b(+) of the comparator 231 is increased; when the potential exceeds the potential V1 of the noninverting input terminal "a(−)", the output "1" of the comparator 231 is applied to the S terminal of the flip-flop 233; and a discharge circuit of the capacitor 234 is formed by the output of the non-Q terminal of this flip-flop 233. Subsequently, the potential of the capacitor 234 is dropped, and the potential of this capacitor 234 is outputted. In connection with this potential, the potential of the noninverting input terminal b(+) of the comparator 232 is dropped, and then, when this dropped potential becomes lower than, or equal to the potential V2 of the noninverting input terminal "a(−)", the output 1 of this comparator 232 is applied to the R terminal of the flip-flop 233. Thus, a charging circuit of the capacitor 234 is formed by the output of the non-Q terminal of the flip-flop 233.

As previously explained, while the charging/discharging potentials of the capacitor 234 are outputted, the triangular wave oscillating circuit 23. Also, the inclination of the triangular wave is determined based upon the magnitude of the charging current "Ir."

It should also be understood that as the inverter circuit of the high frequency heating apparatus driven by the 2-switching element bridge according to the present invention, the present invention is not limited only to the high frequency heating apparatus shown in FIG. 5, but may be applied to all of inverter circuits arranged by such resonance type circuit systems with employment of switching elements in which arms of bridge circuits are constituted by two switching elements.

Figure 13:
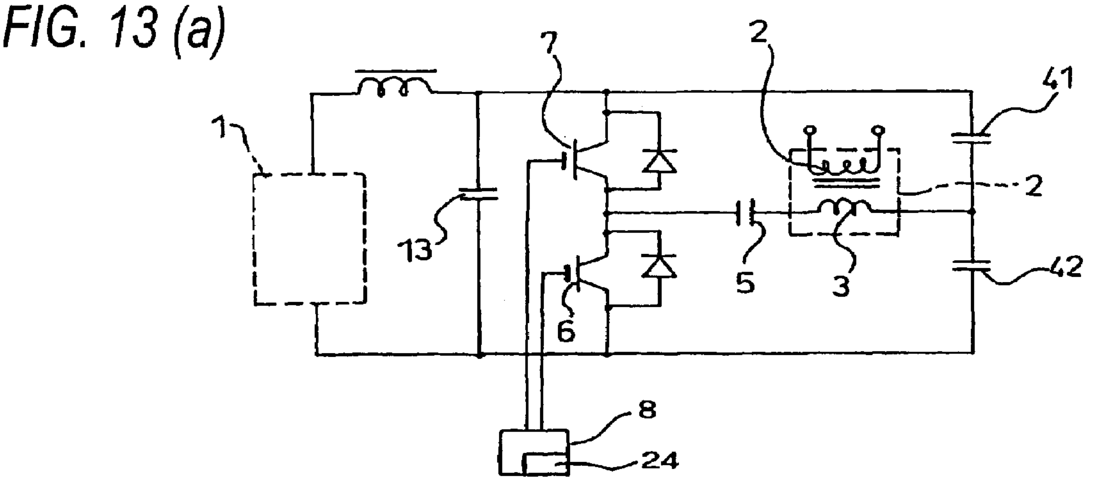
FIG. 13 shows three sets of other examples as to the resonant type high frequency heating apparatus driven by the switching elements of the 2-switching element bridge.
Figure 13:
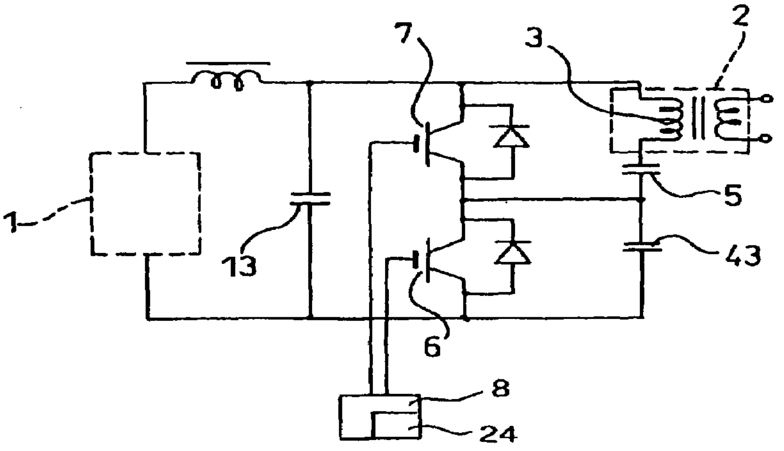
Figure 13:
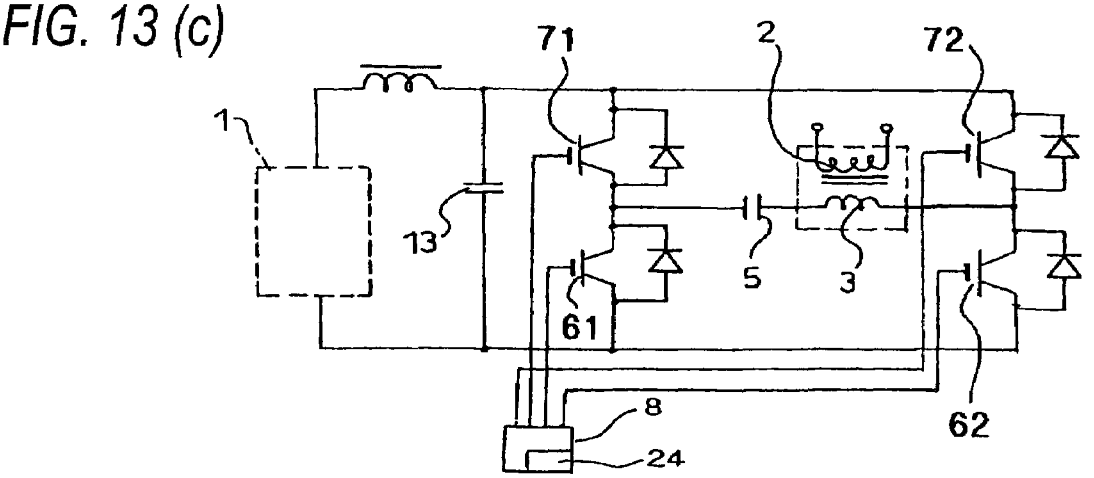

FIGS. 13(*a*), 13(*b*) and 13(*c*) indicate 3 sorts of these inverter circuits.

In FIG. 13(*a*), a DC power supply 1 rectifies an AC voltage of a commercial power supply in a full-wave rectifying mode so as to obtain a DC voltage VDC. The DC power supply 1 applies this DC voltage VDC to both a series-connected circuit made of a first capacitor 41 and a second capacitor 42, and also, to a series-connected circuit constituted by a first semiconductor switching element 6 and a second semiconductor switching element 7. A series-connected circuit constituted by a primary winding 3 of a leakage transformer 2 and a third capacitor 5 has been connected between a junction point, and another junction point. The first-mentioned junction point has been formed between the first capacitor 41 and the second capacitor 42, whereas the last-mentioned junction point has been formed between the first semiconductor switching element 6 and the second semiconductor switching element 7. A control signal supplied from a driving unit 8 is applied to respective bases of the first semiconductor switching element 6 and the second semiconductor switching element 7.

Then, the variable dead time forming circuit 24 according to the present invention has been assembled in the driving unit 8. It should also be noted that a secondary winding of the leakage transformer 2 and a magnetron are omitted from the drawing.

The variable dead time forming circuit 24 makes the dead time constant, or slightly increases the dead time at frequencies lower than, or equal to the predetermined switching frequency, and rapidly increases the dead time at frequencies higher than, or equal to the predetermined switching frequency. As a consequence, such an inverter circuit can be obtained in which a heating loss can be hardly produced in the semiconductor switching element, and further, noise can be hardly generated.

In FIG. 13(*b*), a DC power supply 1 rectifies an AC voltage of a commercial power supply in a full-wave rectifying mode so as to obtain a DC voltage VDC. The DC power supply 1 applies this DC voltage VDC to both a series-connected circuit made of a primary winding 3 of a leakage transformer 2, a first capacitor 5, and a second capacitor 43, and also, to a series-connected circuit constituted by a first semiconductor switching element 6 and a second semiconductor switching element 7. A junction point constituted by the first capacitor 5 and the second capacitor 43 has been shortcircuited to another junction point constituted by the first semiconductor switching element 6 and the second semiconductor switching element 7. A control signal supplied from a driving unit 8 is applied to respective bases of the first semiconductor switching element 6 and the second semiconductor switching element 7.

Then, the variable dead time forming circuit 24 according to the present invention has been assembled in the driving unit 8. It should also be noted that a secondary winding of the leakage transformer 2 and a magnetron are omitted from the drawing.

The variable dead time forming circuit 24 makes the dead time constant, or slightly increases the dead time at frequencies lower than, or equal to the predetermined switching frequency, and rapidly increases the dead time at frequencies higher than, or equal to the predetermined switching frequency. As a consequence, such an inverter circuit can be obtained in which a heating loss can be hardly produced in the semiconductor switching element, and further, noise can be hardly generated.

FIG. 13(*c*) is a circuit diagram for showing a full-bridge circuit.

In FIG. 13(*c*), a DC power supply 1 rectifies an AC voltage of a commercial power supply in a full-wave rectifying mode so as to obtain a DC voltage VDC. The DC power supply 1 applies this DC voltage VDC to both a series-connected circuit made of a first semiconductor switching element 61 and a second semiconductor switching element 71, and also, to a series-connected circuit constituted by a third semiconductor switching element 62 and a fourth semiconductor switching element 72. A series-connected circuit constituted by a primary winding 3 of a leakage transformer 2 and a third capacitor 5 has been connected between a junction point, and another junction point. The first-mentioned junction point has been formed between the first semiconductor switching element 61 and the second semiconductor switching element 71, whereas the last-mentioned junction point has been formed between the third semiconductor switching element 62 and the fourth semiconductor switching element 72. The third capacitor 5 may be omitted. A control signal supplied from a driving unit 8 is applied to respective bases of the first semiconductor switching element 61, the second semiconductor switching element 71, the third semiconductor switching element 62, and the fourth semiconductor switching element 72 respectively. Then, the variable dead time forming circuit 24 according to the present invention has been assembled in the driving unit 8. It should also be noted that a secondary winding of the leakage transformer 2 and a magnetron are omitted from the drawing.

The variable dead time forming circuit 24 makes the dead time constant, or slightly increases the dead time at frequencies lower than, or equal to the predetermined switching frequency, and rapidly increases the dead time at frequencies higher than, or equal to the predetermined switching frequency. As a consequence, such an inverter circuit can be obtained in which a heating loss can be hardly produced in the semiconductor switching element, and further, noise can be hardly generated.

Figure 14:
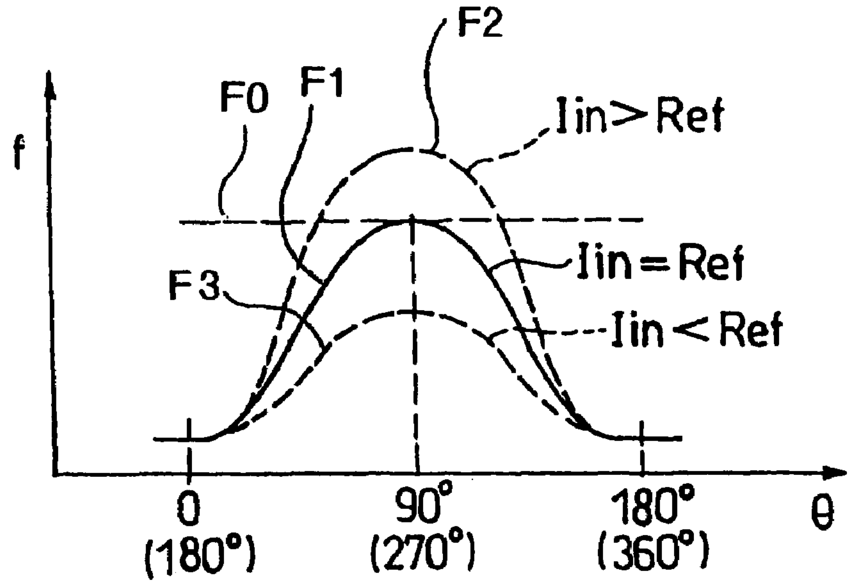
FIG. 14 is a graphic representation for indicating a frequency-to-phase characteristic as to the inverter circuit according to the present invention.

FIG. 14 is a graphic diagram for representing a frequency-to-phase characteristic of the inverter circuit according to the present invention. In FIG. 14, in phases in the vicinity of zero degree and 180 degrees where voltages are low, the switching frequency is decreased, whereas in phases in the vicinity of 90 degrees and 270 degrees, the switching frequency is increased. As a result, since the switching frequency is decreased in the phases near zero degree and 80 degrees where the voltages are low, the output current (voltage) becomes large in correspondence with the current-to-used frequency characteristic of FIG. 1. Conversely, since the voltages are sufficiently high in the phases near 90 degrees and 270 degrees, the switching frequency is maximized, and the output current (voltage) is decreased in correspondence with the current-to-used frequency characteristic of FIG. 1. As a result, as indicated in FIG. 15, the output voltage may become substantially uniform over the phases from zero degree to 180 degrees (180 to 360 degrees).

Figure 1:
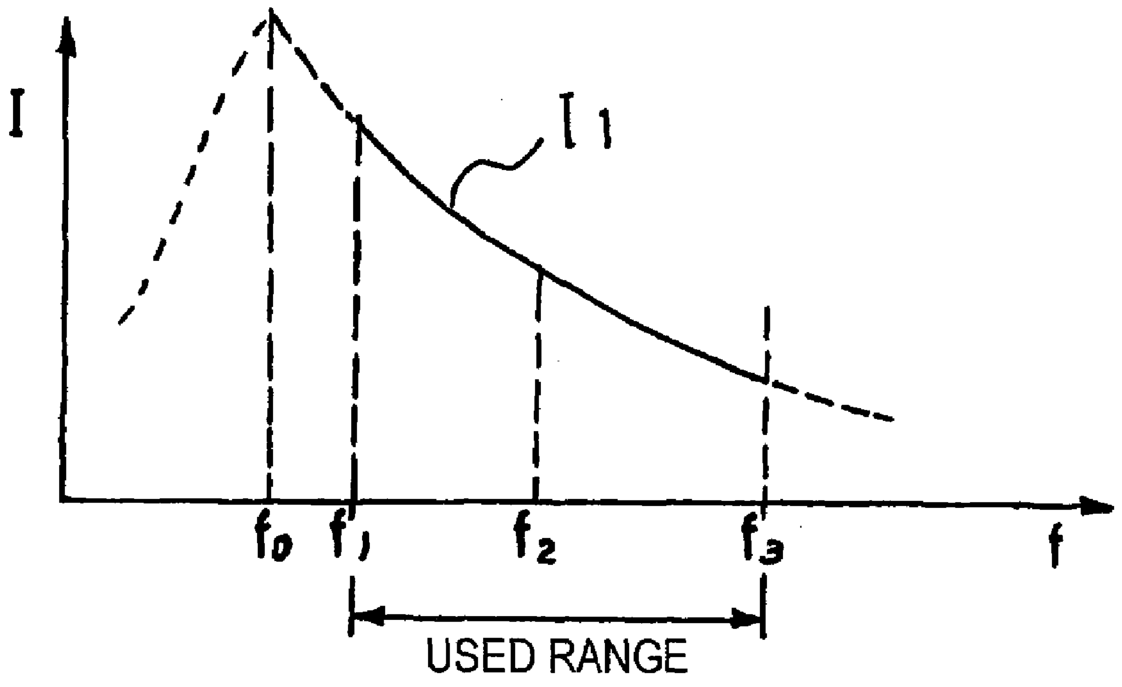
FIG. 1 is a graphic diagram for representing the current-to-used frequency characteristic in the case that the constant voltage is applied to the inverter resonant circuit according to the present invention.

In contact to the above-described condition, in such a case that no change is made in phases as indicated by a dot line "F0" in the frequency-to-phase characteristic of FIG. 14, since the frequency is high even in the phases near zero degree and 180 degrees where the voltages are low, the output current (voltage) is kept small in correspondence with the current-to-used frequency characteristic shown in FIG. 1. As a result, as indicated by a dot line "V1" in FIG. 15, a sufficiently high voltage cannot be obtained in the phases near zero degree and 180 degrees.

Also, a solid line "F1" of FIG. 14 shows a frequency-to-phase diagram in such a case that an input current "Ri (see FIG. 5)" obtained by transferring an AC current by a CT when a DC power supply is formed is made equal to the reference current "Ref" so as to obtain zero error. Another solid line "F2" indicates a frequency-to-phase diagram in the case that the input current Ri is larger than the reference current Ref, and the switching frequency is increased so as to lower the current within the used range of FIG. 1. A solid line "F3" shows a frequency-to-phase diagram in the case that the input current Ri is smaller than the reference current Ref, and the switching frequency is decreased so as to increase the current within the used range of FIG. 1.

Figure 15:
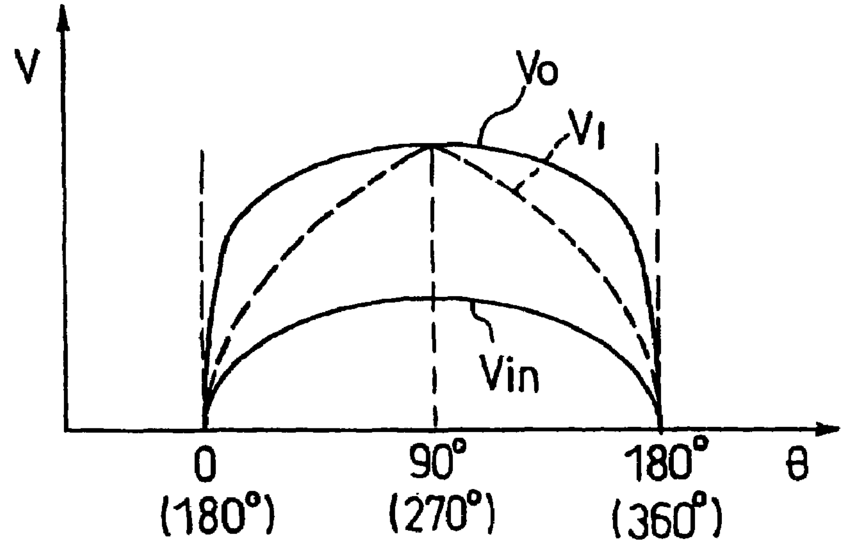
FIG. 15 is a graphic representation for showing an output voltage-to-phase characteristic as to the inverter circuit.

In FIG. 15, symbol "Vin" indicates a voltage waveform of a commercial power supply; a dot line "V1" located over this voltage waveform "Vin" represents such a voltage waveform in such a case that a switching operation is performed at a certain constant frequency over all of the phases; and symbol "V0" indicates a waveform of a voltage (secondary voltage of step-up transformer) which has been produced by frequency-modulating the above-described voltage as explained in FIG. 14. Although ratios of these voltages Vin, V1, V0 are largely different from each other, these voltages are indicated on the same diagram for the sake of easy observation. As indicated by the dot line "F0" of FIG. 14, the secondary voltage of the set-up transformer in the case of the constant frequency which is not modulated corresponds to the dot line "V1", and this voltage waveform is not matched with a non-linear load of a magnetron. To the contrary, as shown in the line diagram "F1" of FIG. 14, since in phases in the vicinity of zero degree and 180 degrees where voltages are low, the switching frequency is decreased, whereas in phases in the vicinity of 90 degrees and 270 degrees, the switching frequency is increased, the output current (voltage) becomes large in the phases near zero degree and 180 degrees where the voltages are low, and conversely, the output current (voltage) is decreased in the phases near 90 degrees and 270 degrees, as represented by symbol "V0" of FIG. 15, a constant voltage may be generated on the secondary side of the step-up transformer even in any phases over the phases defined from zero degree to 180 degrees (180 to 360 degrees). This waveform is matched with the non-linear load of the magnetron.

It should also be noted that this variable dead time forming circuit 24 may become effective as to the control operation of the dead time DT even in such a case that the switching elements (IGBTs) 6 and 7 shown in FIG. 5 are controlled in a duty ratio control manner. This reason is given as follows: That is, in order to increase/decrease the collector voltages VQ7C and VQ8C in the interconnecting manner for controlling the dead time DT, the center voltage of 6 V may be merely changed. Since this center voltage of 6 V is changed, the ON/OFF ratio of the two transistors Q8 and Q7 may be changed (namely, duty ratio control operation). In other words, when the duty ratio of the two transistors Q7 and Q8 is equal to 50:50 (since two transistors Q7/Q8 are operated at power supply voltage of 12 V, when two transistors Q7/Q8 are driven at voltage of 6 V), the output voltage becomes the highest voltage. When the two transistors Q7/Q8 are driven at voltages which are lower than, or higher than 6 V, the collector voltages VQ8C and VQ7C of these two transistors Q8 and Q7 are simultaneously increased and decreased in the interconnecting manner, and thus, the ON/OFF ratio of the two transistors Q8/Q7 is changed. As a result, the output voltage is decreased. However, also in this case, since the offset voltages produced in the resistors R8 and R7 are not changed, the constant output voltage may be maintained. As a consequence, as apparent from the foregoing descriptions, this variable dead time forming circuit 24 may become effective so as to vary the dead time also in the case of the duty ratio control operation.

As previously explained, in accordance with the present invention, the high frequency heating apparatus is arranged by the DC power supply; the series connection circuit constructed of two semiconductor switching elements (IGBTs) which are connected to the DC power supply; the series connection circuit constituted by the capacitor and the primary winding of the leakage transformer connected to both the terminals of one of the two semiconductor switching elements; another capacitor connected to both the terminal of one semiconductor switching element, or the other semiconductor switching element; the driving means for driving the respective semiconductor switching elements respectively; the rectifying means connected to the secondary winding of the leakage transformer; and the magnetron connected to the rectifying means. The above-described high frequency heating apparatus is featured by that the variable dead time forming circuit is provided in the driving means, while the variable dead time forming circuit varies such a dead time that the two semiconductor switching elements are simultaneously turned OFF in response to the switching frequency. Concretely speaking, the variable dead time forming circuit increases the dead time in accordance with the increase of the switching frequency; makes the dead time constant, or slightly increases the dead time at the switching frequency lower than, or equal to the predetermined switching frequency; and rapidly increases the dead time at the switching frequency higher than, or equal to the predetermined switching frequency. Also, the variable dead time forming circuit varies either the constant value or the slightly increased value of the dead time, the switching frequency value which constitutes the inflection point, or the rapidly increased value of the dead time, so that such an inverter circuit can be obtained. That is, in this inverter circuit, the heat loss can be hardly produced in the semiconductor switching element, so that the useless energy cannot be consumed, or the noise can be hardly produced. Furthermore, since the dead time DT in the limit frequency is limited, the turning-ON operation under the limited condition of the IGBT can be secured, and thus, the destruction of the IGBT can be prevented.

While the present invention has been described in detail, or with reference to the specific embodiment modes, it is obvious for the ordinarily-skilled engineers that the present invention may be freely modified and/or changed without departing from the technical scope and spirit of the present invention. The present patent application has been made based upon Japanese Patent Application No. 2004-139994 filed on May 10, 2004, the contents of which have been incorporated herein as references.

INDUSTRIAL APPLICABILITY

Since the above-described arrangement is employed, such an inverter circuit can be obtained in which the heat loss can be hardly produced in the IGBT, and thus, the useless energy is not consumed, and also, the noise can be hardly generated.

The invention claimed is:

1. A high frequency heating apparatus for driving a magnetron, comprising:

a DC power supply;

a series circuit constituted by two pieces of semiconductor switching elements;

a resonant circuit in which a primary winding of a leakage transformer and a capacitor are connected, said series circuit being connected parallel to said DC power supply, and one end of said resonant circuit being connected to a center point of said series circuit and the other end of said resonant circuit being connected to one end of said DC power supply in an AC equivalent circuit;

driving means for driving said semiconductor switching elements respectively;

rectifying means connected to a secondary winding of said leakage transformer;

the magnetron connected to said rectifying means; and a variable dead time forming circuit for varying a dead time during which said respective semiconductor switching elements are simultaneously turned OFF in response to a switching frequency, wherein a limitation is provided under which said dead time is not further widened when the switching frequency is increased.

2. A high frequency heating apparatus for driving a magnetron, comprising:

a DC power supply;

two sets of series circuits, each of said series circuits being constituted by two pieces of semiconductor switching elements;

a resonant circuit in which a primary winding of a leakage transformer and a capacitor are connected, said two sets of series circuits being connected parallel to said DC power supply respectively, and one end of said resonant circuit being connected to a center point of said one series circuit and the other end of said resonant circuit being connected to a center point of the other series circuit;

driving means for driving said semiconductor switching elements respectively;

rectifying means connected to a secondary winding of said leakage transformer;

the magnetron connected to said rectifying means; and a variable dead time forming circuit for varying a dead time during which said respective semiconductor switching elements are simultaneously turned OFF in response to a switching frequency, wherein a limitation is provided under which said dead time is not further widened when the switching frequency is increased.

3. A high frequency heating apparatus for driving a magnetron, comprising:

a DC power supply;

a series circuit constituted by two pieces of semiconductor switching elements;

a resonant circuit in which a primary winding of a leakage transformer and a capacitor are connected, said series circuit being connected parallel to said DC power supply, and said resonant circuit being connected to one of said semiconductor switching elements in a parallel manner;

driving means for driving said semiconductor switching elements respectively;

rectifying means connected to a secondary winding of said leakage transformer; and the magnetron connected to said rectifying means; and a variable dead time forming circuit for varying a dead time during which said respective semiconductor switching elements are simultaneously turned OFF in response to a switching frequency, wherein a limitation is provided under which said dead time is not further widened when the switching frequency is increased.

4. A high frequency heating apparatus as claimed in any one of claims 1 to 3, wherein said variable dead time forming circuit increases the dead time in connection with an increase of a switching frequency.

5. A high frequency heating apparatus as claimed in claim 4, wherein said variable dead time forming circuit makes the dead time constant, or slightly increases the dead time at a switching frequency which is lower than, or equal to a predetermined switching frequency.

6. A high frequency heating apparatus as claimed in claim 5, wherein said variable dead time forming circuit rapidly increases the dead time at a switching frequency which is higher than, or equal to a predetermined switching frequency.

7. A high frequency heating apparatus as claimed in claim 5, wherein either the constant value or the slightly increased value as to said dead time is variable at the switching frequency lower than, or equal to said predetermined switching frequency is variable.

8. A high frequency heating apparatus as claimed in claim 6, wherein the rapidly increased value as to said dead time is variable at the switching frequency higher than, or equal to said predetermined switching frequency is variable.

9. A high frequency heating apparatus as claimed in claim 5, wherein said predetermined frequency is variable.

10. A high frequency heating apparatus as claimed in any one of claims 1 to 3, wherein said variable dead time forming circuit increases the dead time in a step manner in connection with an increase of a switching frequency.

11. A high frequency heating apparatus as claimed in any one of claims 1 to 3, wherein said variable dead time forming circuit forms the dead time based upon both a plus offset voltage and a minus offset voltage, which are changed in a first inclination which is directly proportional to an increase of the switching frequency, and also, which are changed in a second inclination from said predetermined switching frequency.

12. A high frequency heating apparatus as claimed in any one of claims 1 to 3, wherein said variable dead time forming circuit is comprised of:

a VCC power supply;

a duty control power supply;

a first current which is changed directly proportional to a switching frequency;

a second current which flows from the predetermined switching frequency and is changed directly proportional to the switching frequency;

a third current which is produced by combining said first current with said second current and by multiplying said combined current by a predetermined coefficient; and upper/lower potential forming means for forming an upper potential and a lower potential, which are made by adding both a plus offset voltage and a minus offset voltage which are directly proportional to said third current to the voltage of said duty control power supply; and said variable dead time forming circuit forms the dead time based upon said upper potential and said lower potential.

13. A high frequency heating apparatus as claimed in claim 12, wherein either an input power control operation or an input current control operation is carried out by changing at least one of said voltage of the duty control power supply and said switching frequency.

14. In a high frequency heating apparatus for driving a magnetron, which is arranged by a frequency control type resonant inverter circuit having at least one arm including a plurality of semiconductor switching elements; wherein:

said high frequency heating apparatus is further comprised of:

a variable dead time forming circuit for varying a dead time during which said respective semiconductor switching elements are simultaneously turned OFF in response to a switching frequency; and wherein:

said variable dead time forming circuit forms the dead time based upon both a plus offset voltage and a minus offset voltage, which are changed in a first inclination which is directly proportional to an increase of the switching frequency, and also, which are changed in a second inclination from said predetermined switching frequency.

* * * * *